(12) United States Patent
Zhong et al.

(10) Patent No.: US 9,326,618 B2
(45) Date of Patent: May 3, 2016

(54) LOWER LEG REST ADJUSTING DEVICE AND INFANT CARRIER THEREWITH

(71) Applicants: Zhi-Ren Zhong, Guangdong (CN); Fang-Ming Li, Guangdong (CN)

(72) Inventors: Zhi-Ren Zhong, Guangdong (CN); Fang-Ming Li, Guangdong (CN)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 275 days.

(21) Appl. No.: 14/022,219

(22) Filed: Sep. 9, 2013

(65) Prior Publication Data

US 2014/0070590 A1    Mar. 13, 2014

(30) Foreign Application Priority Data

Sep. 10, 2012 (CN) .......................... 2012 1 0332773
Jul. 22, 2013 (CN) .......................... 2013 1 0309660

(51) Int. Cl.
*A47D 1/02* (2006.01)
*A47D 13/02* (2006.01)
*B62B 9/10* (2006.01)

(52) U.S. Cl.
CPC ............... *A47D 13/02* (2013.01); *B62B 9/102* (2013.01)

(58) Field of Classification Search
CPC .......................... B62B 2205/22; B60N 2/4495
USPC .................. 297/250.1, 423.16, 423.26, 423.3
See application file for complete search history.

(56) References Cited

U.S. PATENT DOCUMENTS

| | | | |
|---|---|---|---|
| 6,485,216 B1 * | 11/2002 | Cheng ....................... | B62B 7/06 280/47.36 |
| 7,401,803 B1 * | 7/2008 | Lai ............................ | B62B 7/08 280/47.38 |
| 8,215,661 B2 * | 7/2012 | van Dijk ................... | B62B 7/06 280/642 |
| 8,567,866 B2 * | 10/2013 | Carimati Di Carimate ............... | A47D 1/008 297/184.13 |
| 2009/0121454 A1 | 5/2009 | Tomasi | |
| 2011/0148059 A1 * | 6/2011 | Li ........................... | B62B 9/203 280/47.36 |
| 2011/0175305 A1 | 7/2011 | Chen | |
| 2012/0032490 A1 | 2/2012 | Nowak | |
| 2013/0292987 A1 * | 11/2013 | Doucette ................. | B62B 5/082 297/423.3 |

FOREIGN PATENT DOCUMENTS

| | | |
|---|---|---|
| DE | 200 07 948 U1 | 8/2000 |
| DE | 20 2004 015 227 U1 | 3/2005 |
| EP | 2 336 000 A2 | 6/2011 |
| GB | 2465075 A | 5/2010 |
| GB | 2482574 A | 2/2012 |

* cited by examiner

*Primary Examiner* — Sarah McPartlin
(74) *Attorney, Agent, or Firm* — Winston Hsu; Scott Margo

(57) ABSTRACT

The present invention relates to a lower leg rest adjusting device and an infant carrier therewith for adjusting an angle of a lower leg rest pivoted to a body of an infant carrier. The leg rest adjusting device includes an operating component, a pair of angle-fixing structures and a pair of linking components. Two ends of the lower leg rest adjusting device are pivoted to the body by the pair of angle-fixing structures, and the pair of angle-fixing structures selectively being engaged with the lower leg rest. An end of each linking component is connected to the operating component, the other end of each linking component is connected to the corresponding angle-fixing structure, the operating component driving the pair of linking components to pull the pair of angle-fixing structures to be unlocked from the lower leg rest so as to adjust the angle of the lower leg rest.

29 Claims, 23 Drawing Sheets

LOWER LEG REST ADJUSTING DEVICE AND INFANT CARRIER THEREWITH

BACKGROUND OF THE INVENTION

1. Field of the Invention

The present invention relates to a lower leg rest adjusting device and an infant carrier therewith, especially to a lower leg rest adjusting device and an infant carrier therewith capable of adjusting an angle of a lower leg rest rapidly and simply with one hand.

2. Description of the Prior Art

As the advancing of the society, the economic growth and the development of technology, plenty of goods are supplied to people for improving human life, and a stroller is one of these goods. As well known, the stroller is an infant carrier for transportation. A conventional stroller is required to be capable of folding and provided with other functions to be more comfortable for a child sitting on it. A lower leg rest is often disposed on the stroller for supporting lower legs of the child, and an angle between the lower leg rest and a body of the stroller can be adjusted corresponding to different statuses to satisfy the child for sitting comfortably.

However, when adjusting the angle of the lower leg rest of the conventional stroller, a user needs to unlock both angle-fixing structures disposed between the lower leg rest and the body of the stroller at the same time and keep holding the angle-fixing structures with both hands, so as to release the angle-fixing structures to adjust the angle between the lower leg rest and the body of the stroller. It is inconvenient for the user in adjusting the lower leg rest, especially when the user cannot use the both hands at the same time. Therefore, it is necessary to provide a lower leg adjusting device and an infant carrier therewith for solving the above drawbacks.

SUMMARY OF THE INVENTION

A purpose of the present invention is to provide a lower leg rest adjusting device capable of adjusting an angle of a lower leg rest rapidly and simply with one hand.

Another purpose of the present invention is to provide an infant carrier capable of adjusting an angle of a lower leg rest of the infant carrier rapidly and simply with one hand.

For achieving the above purpose, a lower leg rest adjusting device of the present invention is for adjusting an angle of a lower leg rest pivoted to a body of an infant carrier, the lower leg rest adjusting device includes an operating component, a pair of angle-fixing structures and a pair of linking components. Two ends of the lower leg rest adjusting device is pivoted to the body by the pair of angle-fixing structures, and the pair of angle-fixing structures is selectively engaged with the lower leg rest. An end of each linking component is connected to the operating component, the other end of each linking component is connected to the corresponding angle-fixing structure, the operating component drives the pair of linking components to pull the pair of angle-fixing structures to be unlocked from the lower leg rest so as to adjust the angle of the lower leg rest.

Preferably, The lower leg rest adjusting device further includes a pair of driving components, the operating component is slidably disposed on the lower leg rest, the pair of driving components is disposed on two opposite sides of the operating component respectively, each of the pair of driving components is connected to the corresponding linking component. The operating component sliding inward the lower leg rest to drive the pair of driving components to move close to each other so that the angle fixing structure is detached form the lower leg rest simultaneously so as to adjust the angle of the lower leg rest rapidly and simply.

Preferably, a sliding direction of the operating component and a sliding direction of the driving component are intersected so that the operating component drives the pair of driving components to slide close to the operating component or far away from the operating component more reliably.

Preferably, the operating component includes a first inclined surface, each of the pair of driving components includes a second inclined surface, and the first inclined surface and the second inclined surface contact against each other, so that the operating component reliably drives the pair of driving components to synchronously come close to each other.

Preferably, the lower leg rest adjusting device includes an installation holder, the operating component is slidably disposed in the installation holder, an end of the operating component is protruded out of the installation holder, contacting inclined surfaces of the driving component and the operating component is disposed inside the installation holder, the linking component is disposed inside the lower leg rest for conveniently disposing the operating component and the pair of driving components on the lower leg rest.

Preferably, the operating component includes an anti-release protrusion contacting with the installation holder for preventing the operating component to detach form the installation holder as the operating component slides in a direction far away from the lower leg rest.

Preferably, each angle-fixing structure includes an engaging component, a first base and a second base engaged with the first base, the first base is connected to the lower leg rest, the second base is connected to the body, a containing chamber is formed by engaging the first base with the second base along a horizontal direction, and the engaging component is contained in the containing chamber. Specifically, the first base includes a first engaging portion stretching into the containing chamber for engaging with a side of the engaging component, the second base includes a second engaging portion stretching into the containing chamber for engaging with the other side of the engaging component, the second engaging portion is opposite to the first engaging portion, the engaging component is selectively engaged with the first engaging portion, the pair of angle-fixing structures release the lower leg rest when the engaging component detaches from the first engaging component, and the pair of angle-fixing structures fix the lower leg rest when the engaging component engages with the first engaging portion and the second engaging portion. The engaging component detaches from the first engaging portion so that the pair of angle-fixing structures release the lower leg rest for adjusting the angle of the lower leg rest; and the engaging component engages with the first engaging portion and the second engaging portion so that the pair of angle-fixing structures fix the lower leg rest for supporting the body.

Preferably, each angle-fixing structure includes a pushing component and a resilient component, the pushing component is pivotally contained in the containing chamber and arranged with the engaging component, the resilient component is connected to the engaging component and the second base. The first base further includes a pushing portion, a withstanding portion is disposed on the pushing component corresponding to the pushing portion, the linking component is connected to the corresponding pushing component, the pushing portion engages with the withstanding portion so that the pushing component drives the engaging component to move toward the second base for detaching from the first engaging portion when the linking component pulls the corresponding pushing component to pivot. Because of the engagement of the pushing portion, the withstanding portion and the resilient component, the pushing portion engages with the withstanding portion so that the pushing component drives the engaging component to move toward the second base for detaching from the first engaging portion when the linking component pulls the corresponding pushing component to pivot, the pair of angle-fixing structures release the lower leg rest for pivotally adjusting the angle of the lower leg rest.

Preferably, a sheathing portion is disposed in the containing chamber, and the resilient component, the engaging component and the pushing component sheathes the sheathing portion sequentially for conveniently disposing the resilient component, the engaging component and the pushing component in the containing chamber.

Preferably, the first base includes a first sheathing pillar stretching toward the second base into the containing chamber, the second base includes a second sheathing pillar stretching toward the second base into the containing chamber, and the first sheathing pillar and the second sheathing pillar are connected to form the sheathing portion to simplify the structure of the sheathing portion.

Preferably, a third inclined surface is formed on the pushing portion, and a fourth inclined surface is formed on the withstanding portion correspondingly for contacting against the third inclined surface, so that the pushing component drives the engaging portion to move toward the second base more reliably for detaching the engaging component from the first engaging portion by the engagement of the third inclined surface and the fourth inclined surface when pivoting, and the angle-fixing structure since release the lower leg rest.

Preferably, a plurality of first engaging pieces is protruded out of the first base and spaced annularly to form the first engaging portion for engaging with the engaging component, and a plurality of second engaging pieces is protruded out of the second base and spaced annularly to form the second engaging portion for engaging with the engaging component.

Preferably, the second base includes a stepping locking portion disposed in the containing chamber, the engaging component is slidably installed between the first base and the second base, and the engaging component is selectively engaged with the stepping locking portion for adjusting the angle between the first base and the second base.

Preferably, a sliding direction of the engaging component and a pivotal axis of the first base and the second base are intersected so that the engaging component is slidably engaged with or detached from the stepping locking portion for easy operating the engaging component to be locked or unlocked.

Preferably, the second base includes at least two locking portions disposed in the containing chamber, and the at least two locking portions are spaced along a pivoting direction of the lower leg rest to form the stepping locking portion to simplify the structure of the stepping locking portion.

Preferably, the locking portion includes a fastening portion selectively engaged with one of the least two locking portions for easy engaging the engaging component with the first base.

Preferably, one of the locking portion and the fastening portion is a sunken slot and the other of the locking portion and the fastening portion is a protrusion to simplify the structure of the locking portion and the fastening portion.

Preferably, each angle-fixing structure further includes a resilient component, an end of the resilient component is connected to the engaging component, and the other end of the resilient component is connected to the first base for easy and reliably restoring the engaging component.

Preferably, each angle-fixing structure further includes a pivotal shaft, and the pivotal shaft passes through the first base, the engaging component and the second base.

Preferably, a sliding opening is disposed on the engaging component, the pivotal shaft is inserted in the sliding opening, and the engaging component slides relative to the pivotal shaft passes through the engaging component so that the engaging component is engaged with or detached from the stepping locking portion.

Preferably, the lower leg rest includes a horizontal frame and two side frames connected to the horizontal frame, and the operating component is disposed on the horizontal frame.

Preferably, an opening is formed on the horizontal frame, and the operating component passes though the opening to be slidably disposed on the horizontal frame for conveniently installing and disposing the operating component.

An infant carrier of the present invention includes a body, a lower leg rest pivoted to the body of the infant carrier and a lower leg rest adjusting device. The lower leg rest adjusting device includes an operating component, a pair of angle-fixing structures and a pair of linking components. Two ends of the lower leg rest adjusting device is pivoted to the body by the pair of angle-fixing structures, and the pair of angle-fixing structures is selectively engaged with the lower leg rest. An end of each linking component is connected to the operating component, the other end of each linking component is connected to the corresponding angle-fixing structure, the operating component drives the pair of linking components to pull the pair of angle-fixing structures to be unlocked from the lower leg rest so as to adjust the angle of the lower leg rest.

Preferably, The lower leg rest adjusting device further includes a pair of driving components, the operating component is slidably disposed on the lower leg rest, the pair of driving components is disposed on two opposite sides of the operating component respectively, each of the pair of driving components is connected to the corresponding linking component. The operating component sliding inward the lower leg rest to drive the pair of driving components to move close to each other so that the angle fixing structure is detached from the lower leg rest simultaneously so as to adjust the angle of the lower leg rest rapidly and simply.

Preferably, a sliding direction of the operating component and a sliding direction of the driving component are intersected so that the operating component drives the pair of driving components to slide close to the operating component or far away from the operating component more reliably.

Preferably, each angle-fixing structure includes an engaging component, a first base and a second base engaged with the first base, the first base is connected to the lower leg rest, the second base is connected to the body, a containing chamber is formed by engaging the first base with the second base along a horizontal direction, and the engaging component is contained in the containing chamber. Specifically, the first base includes a first engaging portion stretching into the containing chamber for engaging with a side of the engaging component, the second base includes a second engaging portion stretching into the containing chamber for engaging with the other side of the engaging component, the second engaging portion is opposite to the first engaging portion, the engaging component is selectively engaged with the first engaging portion, the pair of angle-fixing structures release the lower leg rest when the engaging component detaches from the first engaging component, and the pair of angle-fixing structures fix the lower leg rest when the engaging component engages with the first engaging portion and the second engaging portion. The engaging component detaches from the first engaging portion so that the pair of angle-fixing structures release the lower leg rest for adjusting the angle of the lower leg rest; and the engaging component engages with the first engaging portion and the second engaging portion so that the pair of angle-fixing structures fix the lower leg rest for supporting the body.

Preferably, the second base includes a stepping locking portion disposed in the containing chamber, the engaging component is slidably installed between the first base and the second base, and the engaging component is selectively engaged with the stepping locking portion for adjusting the angle between the first base and the second base.

Preferably, a sliding direction of the engaging component and a pivotal axis of the first base and the second base are intersected so that the engaging component is slidably engaged with or detached from the stepping locking portion for easy operating the engaging component to be locked or unlocked.

Preferably, the second base includes at least two locking portions disposed in the containing chamber, and the at least two locking portions are spaced along a pivoting direction of the lower leg rest to form the stepping locking portion to simplify the structure of the stepping locking portion.

Preferably, the locking portion includes a fastening portion selectively engaged with one of the least two locking portions for easy engaging the engaging component with the first base.

Preferably, one of the locking portion and the fastening portion is a sunken slot and the other of the locking portion and the fastening portion is a protrusion to simplify the structure of the locking portion and the fastening portion.

Preferably, each angle-fixing structure further includes a resilient component, an end of the resilient component is connected to the engaging component, and the other end of the resilient component is connected to the first base for easy and reliably restoring the engaging component.

Preferably, each angle-fixing structure further includes a pivotal shaft, and the pivotal shaft passes through the first base, the engaging component and the second base.

Preferably, a sliding opening is disposed on the engaging component, the pivotal shaft is inserted in the sliding opening, and the engaging component slides relative to the pivotal shaft passes through the engaging component so that the engaging component is engaged with or detached from the stepping locking portion.

Preferably, the lower leg rest includes a horizontal frame and two side frames connected to the horizontal frame, and the operating component is disposed on the horizontal frame for intuitively and conveniently operating.

Preferably, an opening is formed on the horizontal frame, and the operating component passes though the opening to be slidably disposed on the horizontal frame for conveniently installing and disposing the operating component and covering the visual effect so that the frame looks more beautiful.

The both ends of the lower leg rest are pivoted to the body by the corresponding angle-fixing structures, the angle-fixing structures are selectively engaged with the lower leg rest, the end of each linking component is connected to the operating component, and the other end of each linking component is connected to the corresponding angle-fixing structures. As a user operates the operating component with one hand, the operating component drives each linking component to pull the corresponding angle-fixing structures to release from the end of the lower leg rest so as to adjust the angle of the lower leg rest. Therefore, the lower leg rest adjusting devices and the infant carrier therewith of the present invention are capable of adjusting the angle of the lower leg rest with one hand rapidly and conveniently.

These and other objectives of the present invention will no doubt become obvious to those of ordinary skill in the art after reading the following detailed description of the preferred embodiment that is illustrated in the various Figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
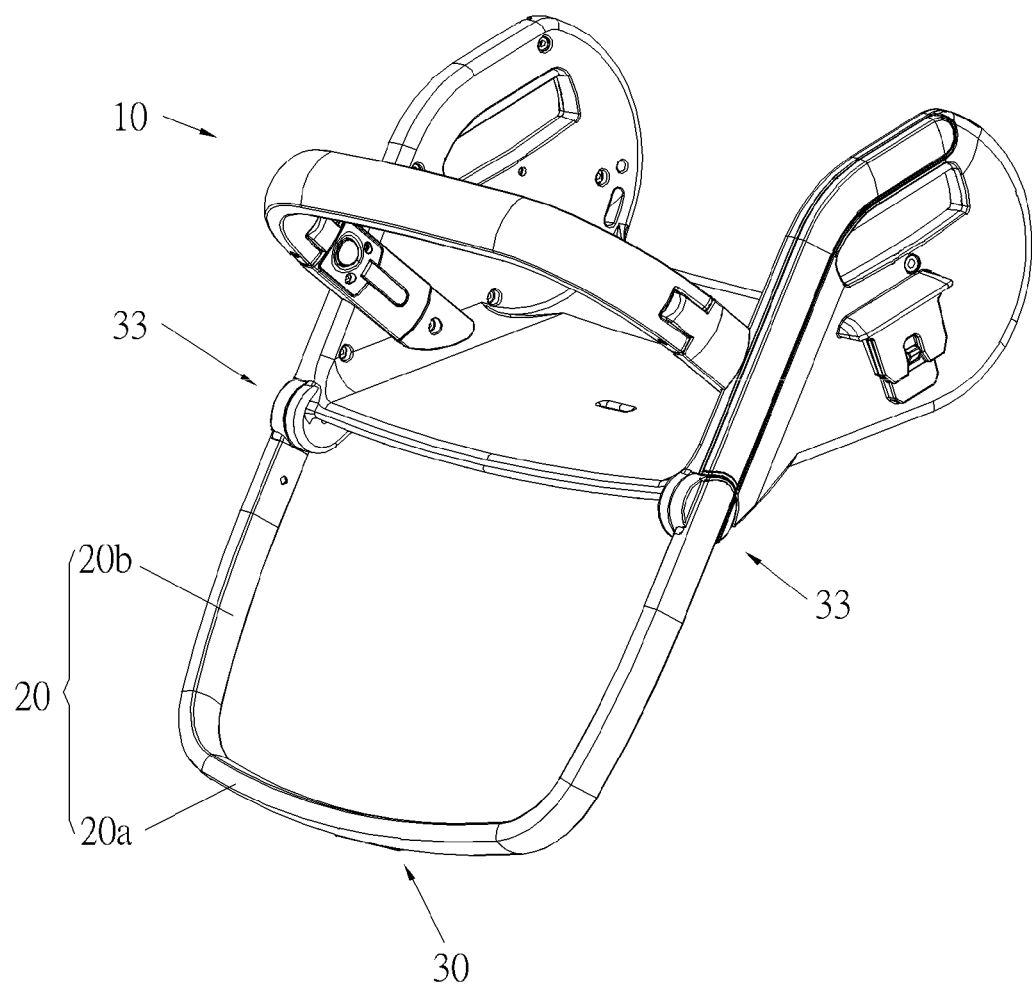
FIG. 1 is a partial schematic drawing of an infant carrier according to a first embodiment of the present invention.
Figure 2:
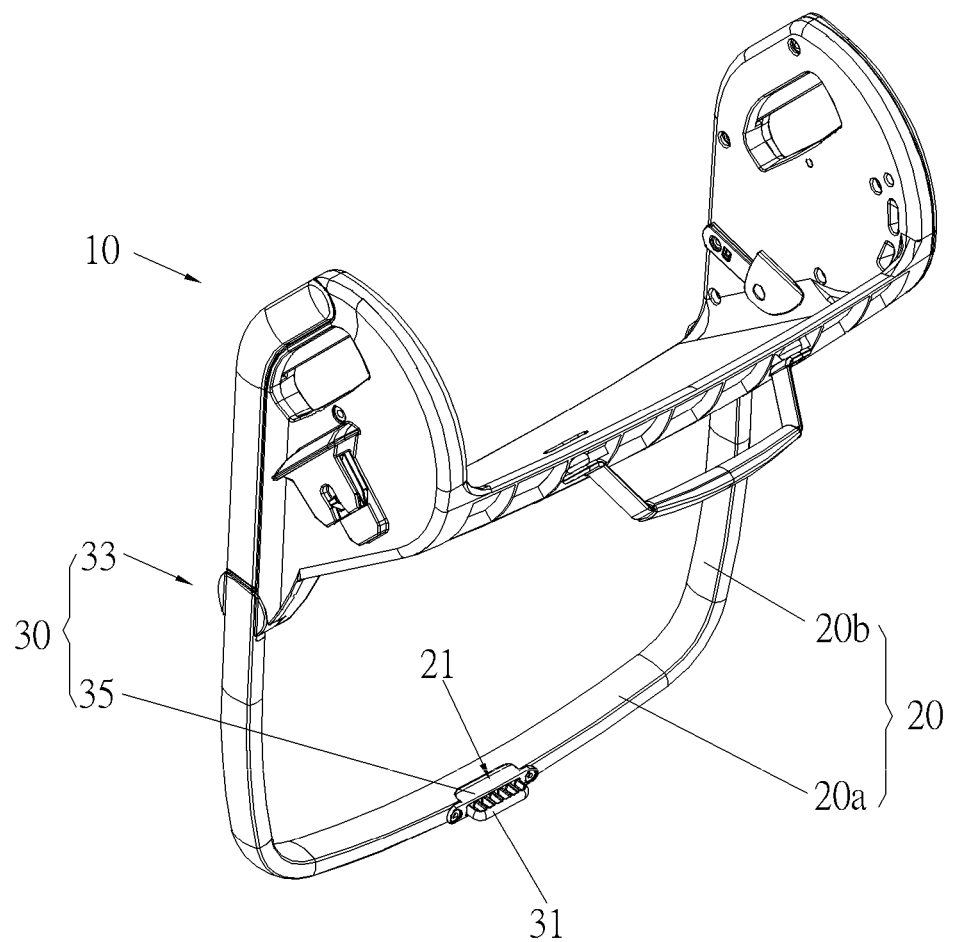
FIG. 2 is a schematic drawing of the infant carrier in FIG. 1 in a different view angle according to the first embodiment of the present invention.
Figure 3:
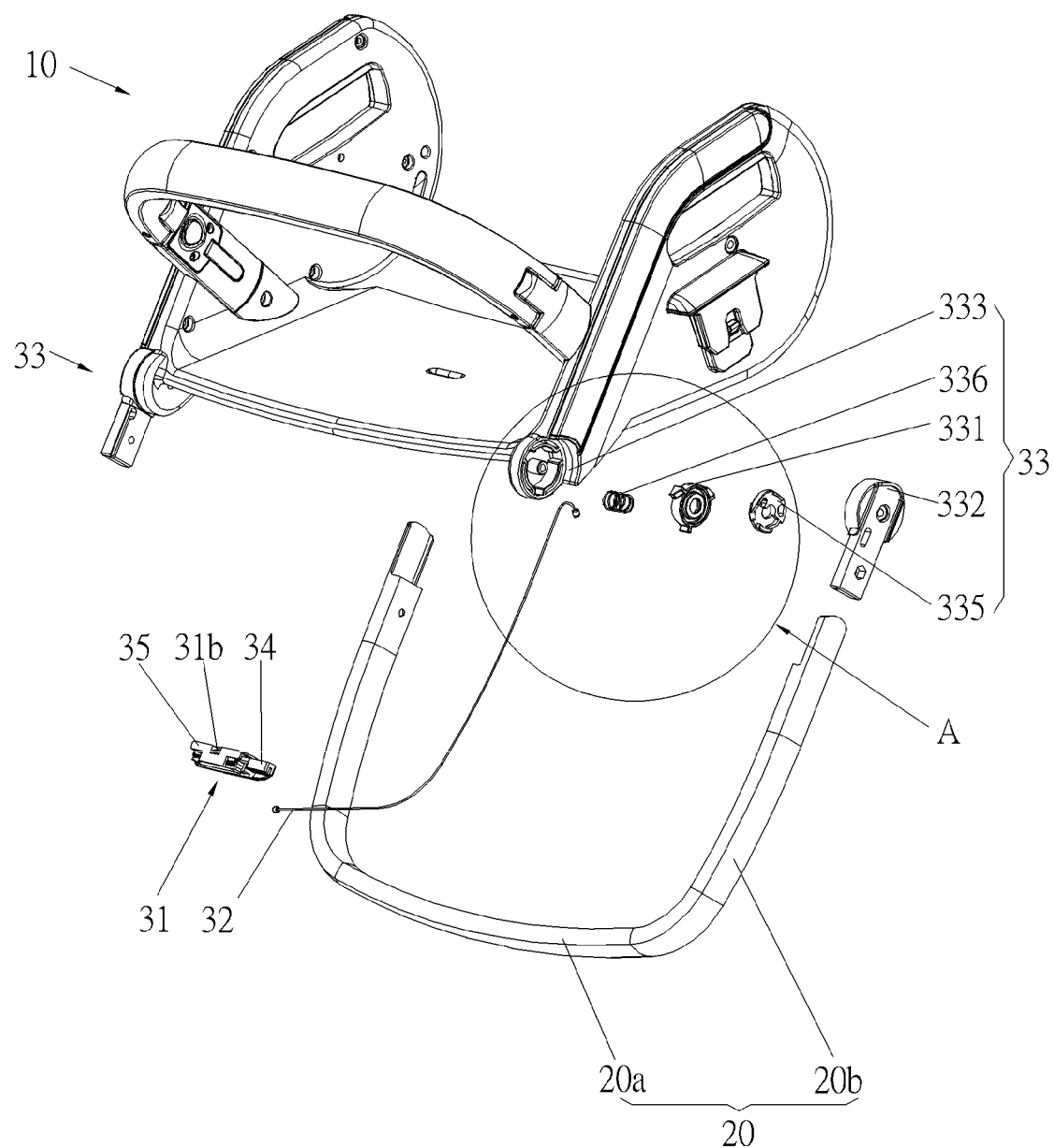
FIG. 3 is an exploded diagram of the infant carrier in FIG. 1 according to the first embodiment of the present invention.
Figure 4:
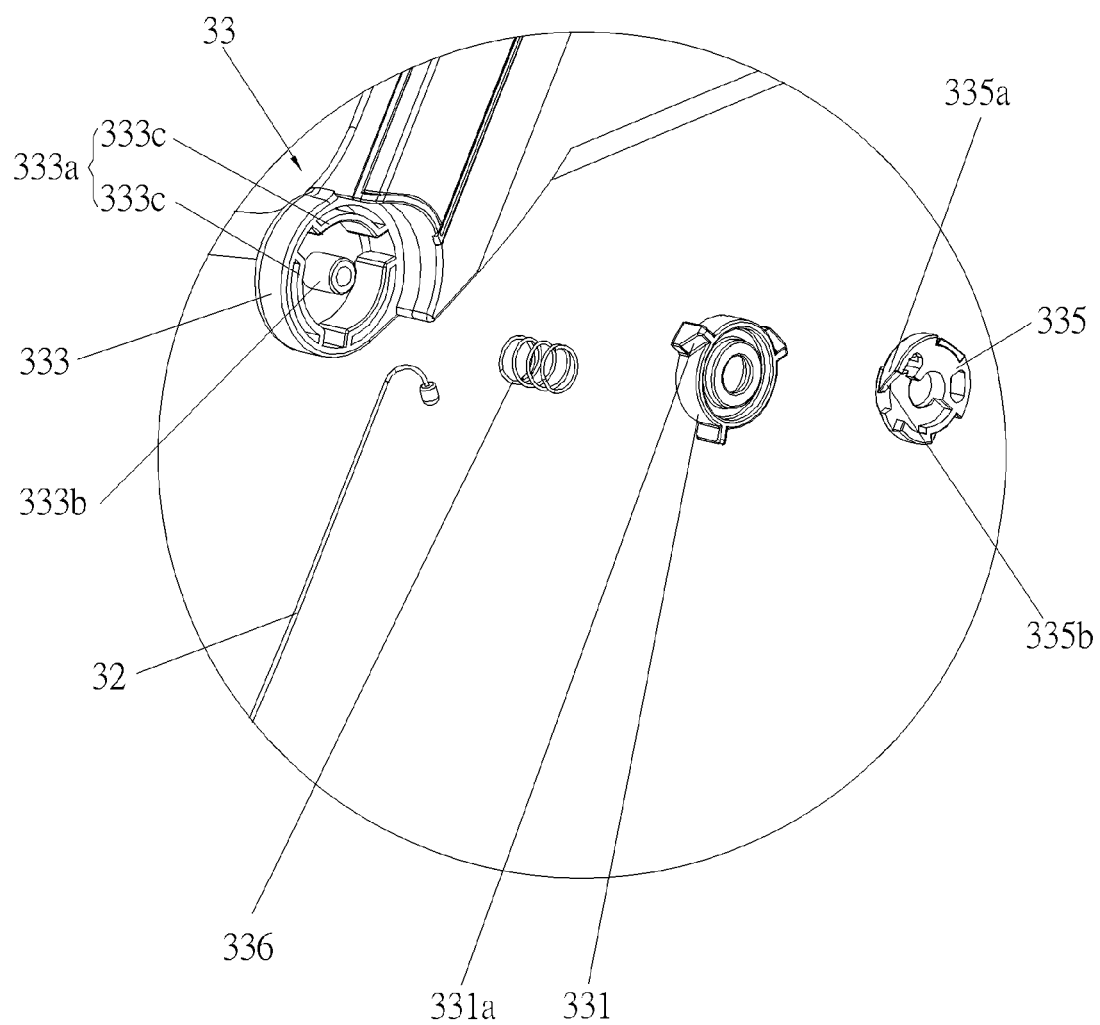
FIG. 4 is an enlarged diagram of area A shown in FIG. 3 according to the first embodiment of the present invention.
Figure 5:
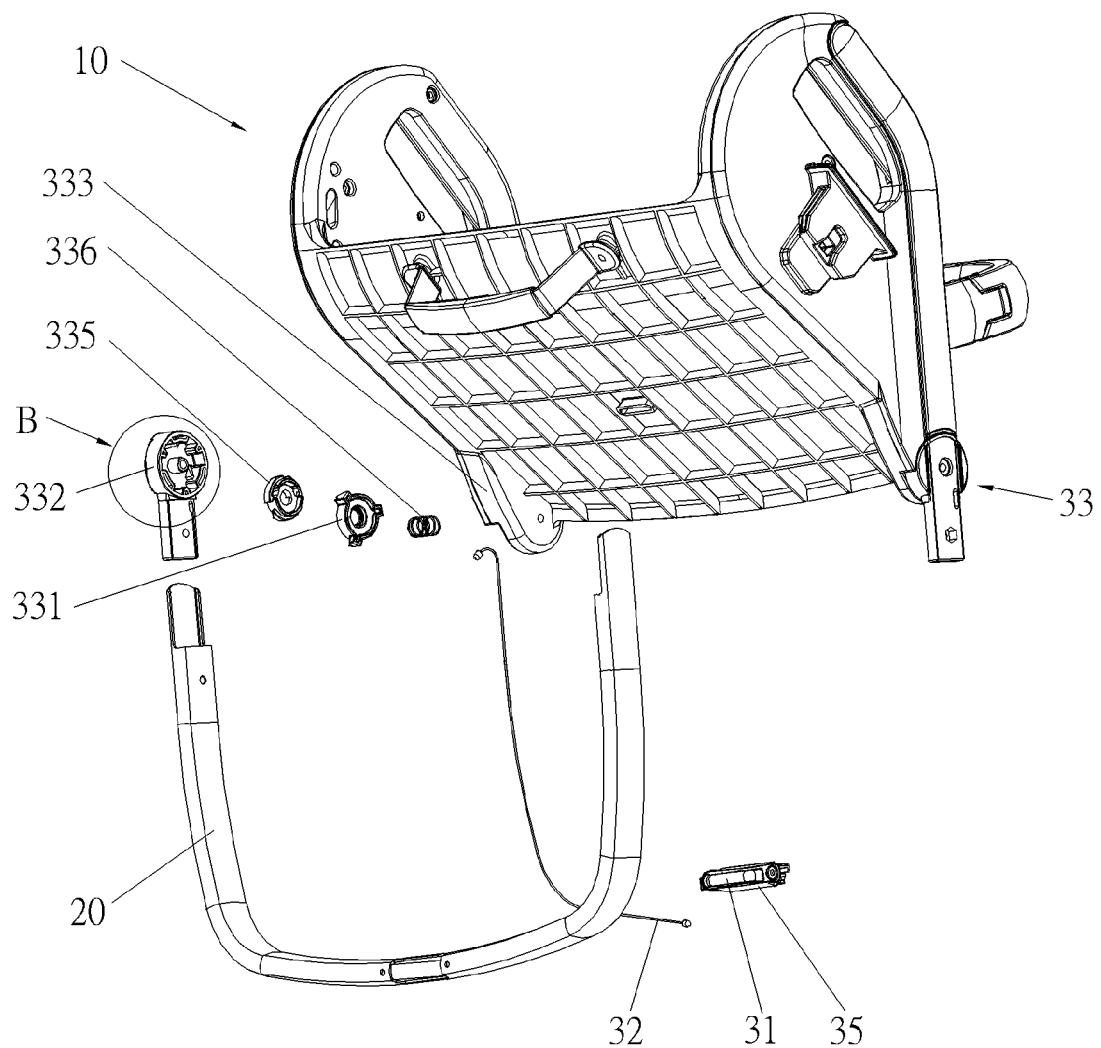
FIG. 5 is an exploded diagram of the infant carrier in FIG. 1 in a different view angle according to the first embodiment of the present invention.
Figure 6:
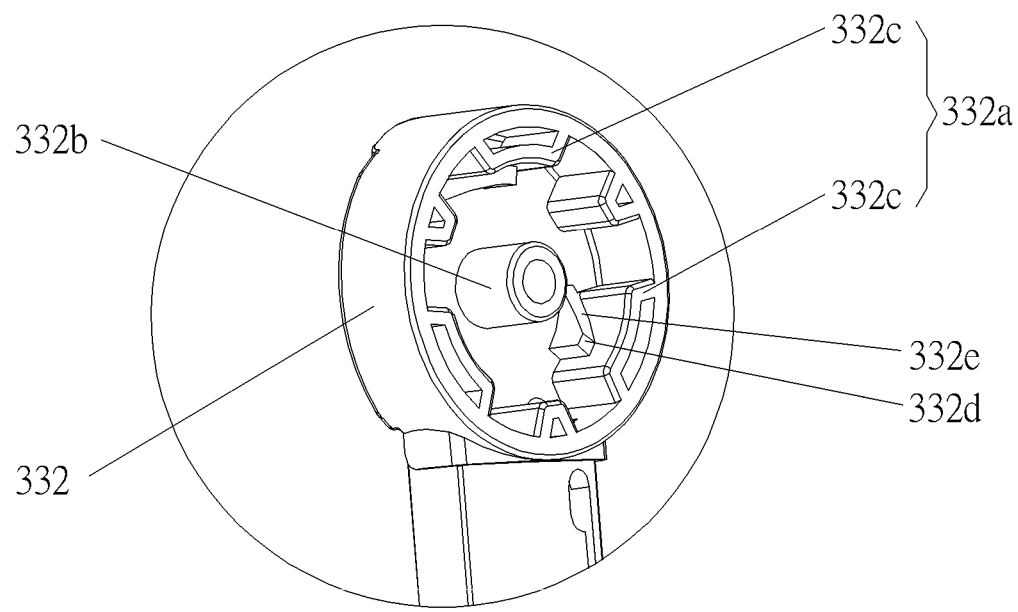
FIG. 6 is an enlarged diagram of area B shown in FIG. 5 according to the first embodiment of the present invention.
Figure 7:
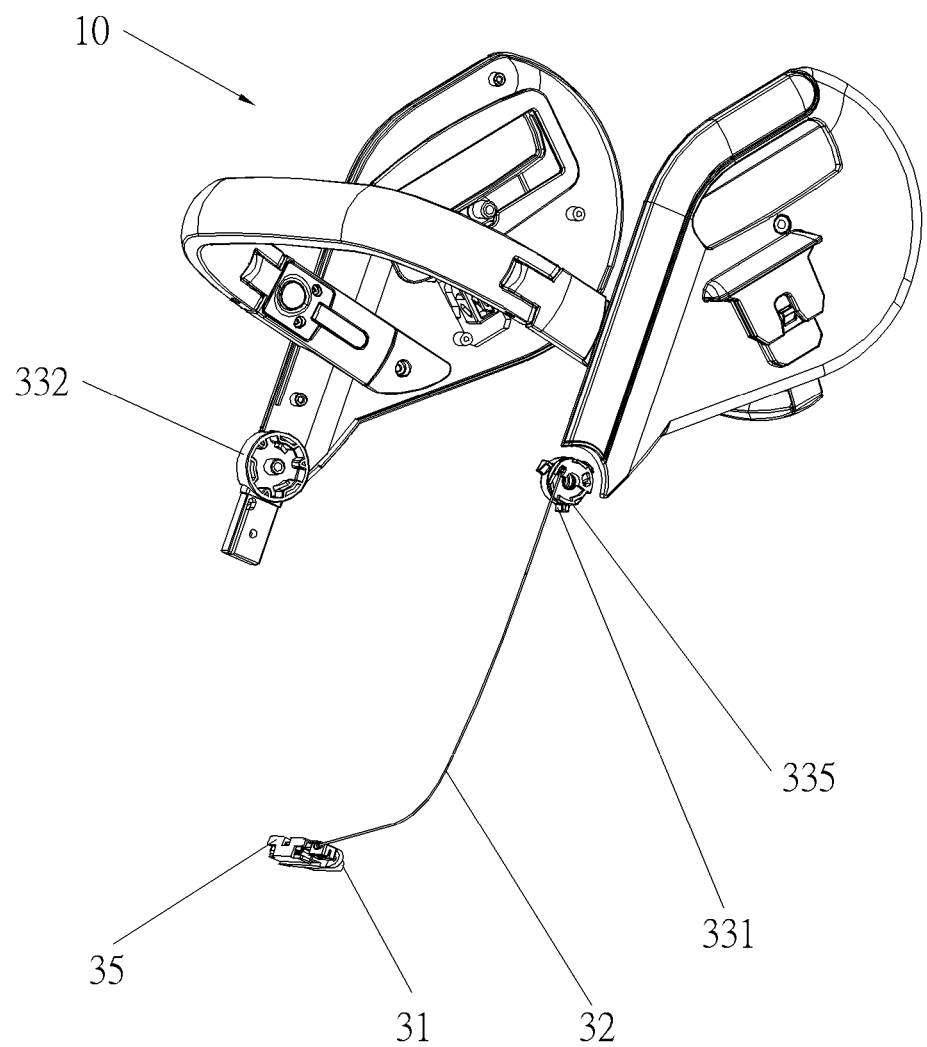
FIG. 7 is an exploded diagram of the infant carrier with a lower leg rest and a part of a lower leg rest adjusting device, according to the first embodiment of the present invention.
Figure 8:
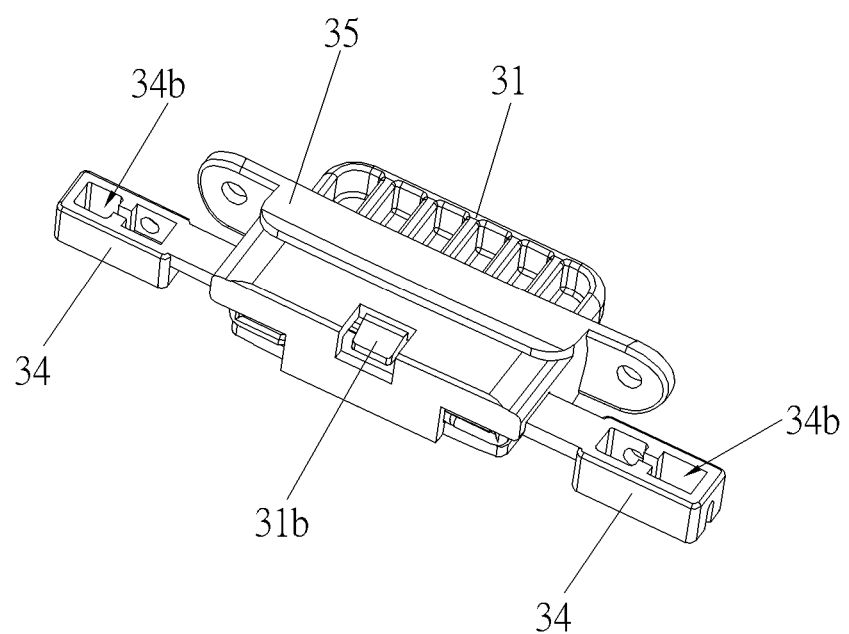
FIG. 8 is a diagram of an operating component, an installation holder and a pair of driving components of the lower leg rest adjusting device of the infant carrier according to the first embodiment of the present invention.
Figure 9:
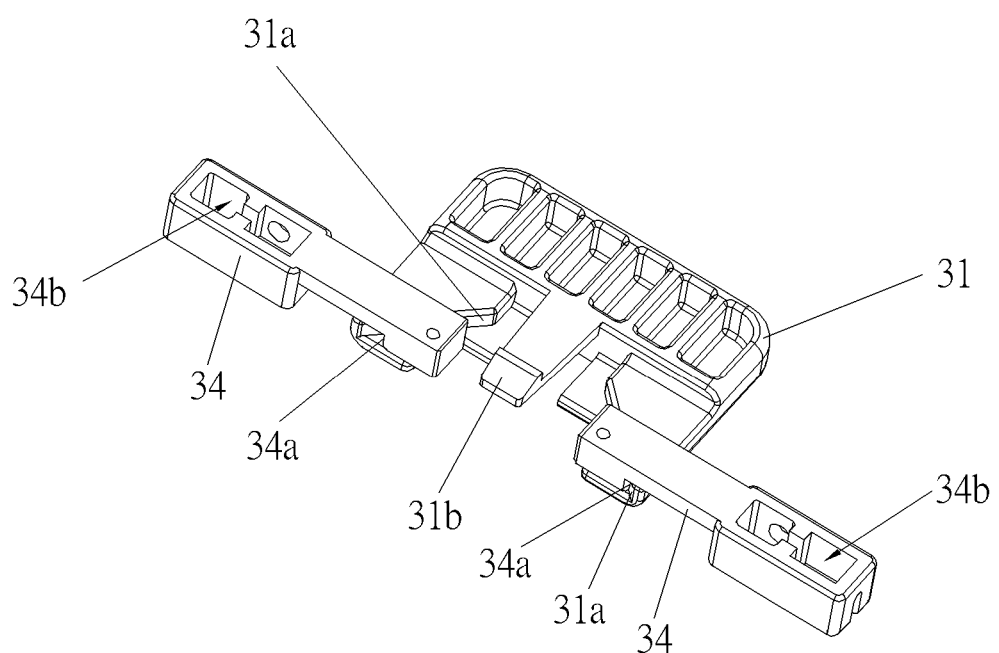
FIG. 9 is a diagram of the operating component and the pair of driving components of the lower leg rest adjusting device of the infant carrier according to the first embodiment of the present invention.

Please refer to FIG. 1 to FIG. 9. FIG. 1 is a partial schematic drawing of an infant carrier 100 according to a first embodiment of the present invention. FIG. 2 is a schematic drawing of the infant carrier 100 in FIG. 1 in a different view angle according to the first embodiment of the present invention. FIG. 3 is an exploded diagram of the infant carrier 100 in FIG. 1 according to the first embodiment of the present invention. FIG. 4 is an enlarged diagram of area A shown in FIG. 3 according to the first embodiment of the present invention. FIG. 5 is an exploded diagram of the infant carrier 100 in FIG. 1 in a different view angle according to the first embodiment of the present invention. FIG. 6 is an enlarged diagram of area B shown in FIG. 5 according to the first embodiment of the present invention. FIG. 7 is an exploded diagram of the infant carrier 100 with a lower leg rest 20 and a part of a lower leg rest adjusting device 30, according to the first embodiment of the present invention. FIG. 8 is a diagram of an operating component 31, an installation holder 35 and a pair of driving components 34 of the lower leg rest adjusting device 30 of the infant carrier 100 according to the first embodiment of the present invention. FIG. 9 is a diagram of the operating component 31 and the pair of driving components 34 of the lower leg rest adjusting device 30 of the infant carrier 100 according to the first embodiment of the present invention.

The infant carrier 100 of the present invention includes a body 10, a lower leg rest 20 pivoted to the body 10 and a lower leg rest adjusting device 30. Specifically, the infant carrier 100 is preferably a stroller, but not limited to this. For example, the infant carrier 100 can be a high chair, a baby swing or a baby bouncer. As shown in FIG. 2 and FIG. 3, according to the first embodiment, the lower leg rest adjusting device 30 includes an operating component 31, a pair of linking components 32 and a pair of angle-fixing structures 33. Two ends of the lower leg rest adjusting device 30 are pivoted to the body 10 by the pair of angle-fixing structures 33, and the pair of angle-fixing structures 33 are selectively engaged with the lower leg rest 20. An end of each linking component 32 is connected to the operating component 31, and the other end of each linking component 32 is connected to the corresponding angle-fixing structure 33. The operating component 31 drives the pair of linking components 32 to pull the pair of angle-fixing structures 33 to be unlocked from the lower leg rest 20 so as to adjust the angle of the lower leg rest 20.

Preferably, the operating component 31 is slidably disposed on the lower leg rest 20 according to the first embodiment. Specifically, the lower leg rest 20 includes a horizontal frame 20a and two side frames 20b connected to the horizontal frame 20a, and more specifically, an opening 21 is formed on a bottom of the horizontal frame 20a, and the operating component 31 passes though the opening 21 to be slidably disposed on the horizontal frame 20a. Because the operating component 31 is disposed on the bottom of the horizontal frame 20a, the lower leg rest 20 is covered by the horizontal frame 20a, for achieving a visual effect of hiding the operating component 31, so that an outward appearance is pure and aesthetic.

Please refer to FIG. 3, FIG. 8 and FIG. 9, the lower leg rest adjusting device 30 further includes a pair of driving components 34, and the pair of driving components 34 is disposed on two opposite sides of the operating component 31 respectively. Preferably, a sliding direction of the operating components 31 and a sliding direction of the pair of driving component 34 are intersected, and preferably the sliding direction of the operating component 31 and the sliding direction of the pair of driving component 34 are perpendicularly intersected so that the operating component 31 drives the pair of driving components 34 to slide close to each other more reliably. Each driving component 34 preferably contacts the operating component 31, and each driving component 34 is connected to the corresponding linking component 32. Specifically, each linking component 32 is detachably disposed in a containing chamber 34b opened on each driving component 34 according to the first embodiment. Each linking component 32 is connected to the corresponding angle-fixing structure 33 so that the pair of linking components 32 move close to each other synchronously as the operating component 31 slides on the lower leg rest 20. The pair of driving components 34 move close to each other synchronously to drive the angle-fixing structures 33 to release from the lower leg rest 20. Accordingly, the lower leg rest 20 pivots relative to the body 10 for adjusting the lower leg rest 20 rapidly and simply.

According to the first embodiment, each driving component 34 contacts an inclined surface of the operating component 31 so that the pair of driving components 34 move close to each other. Specifically, the operating component includes a first inclined surface 31a, each of the pair of driving components 34 includes a second inclined surface 34a, and the first inclined surface 31a and the second inclined surface 34a contact against each other, so that the operating component 31 reliably drives the pair of driving components 34 to synchronously come close to each other. Preferably, the first inclined surfaces 31a are disposed facing to each other and stretched out so that the operating component 31 reliably drives the pair of driving components 34 to synchronously come close to or leave away from each other.

Accordingly, for conveniently disposing the operating component 31 and the pair of driving components 34 on the lower leg rest, the lower leg rest adjusting device 30 further includes the installation holder 35, the operating component 31 is slidably disposed in the installation holder 35, an end of the operating component 31 is protruded out of the installation holder 35, contacting inclined surfaces of the driving component 34 and the operating component 31 are disposed inside the installation holder 35, and the pair of linking components 32 are disposed inside the lower leg rest 20 for conveniently disposing the operating component 31 and the pair of driving components 34 on the lower leg rest 20. And more specifically, the pair of linking components 32 are disposed on the horizontal frame 20a and the two side frames 20b. Preferably, the installation holder 35 is embedded in the lower leg rest 20 with hollowed structure for easy installing the operating component 31 and the pair of driving components 34.

In addition, the operating component 31 includes an anti-release protrusion 31b contacting with the installation holder 35 for preventing the operating component 31 to detach from the installation holder 35 as the operating component 31 slides in a direction far away from the lower leg rest 20. Preferably, the anti-release protrusion 31b is inserted in the installation holder so that the anti-release protrusion 31b contacts with the installation holder 35 more reliably.

Figure 10:
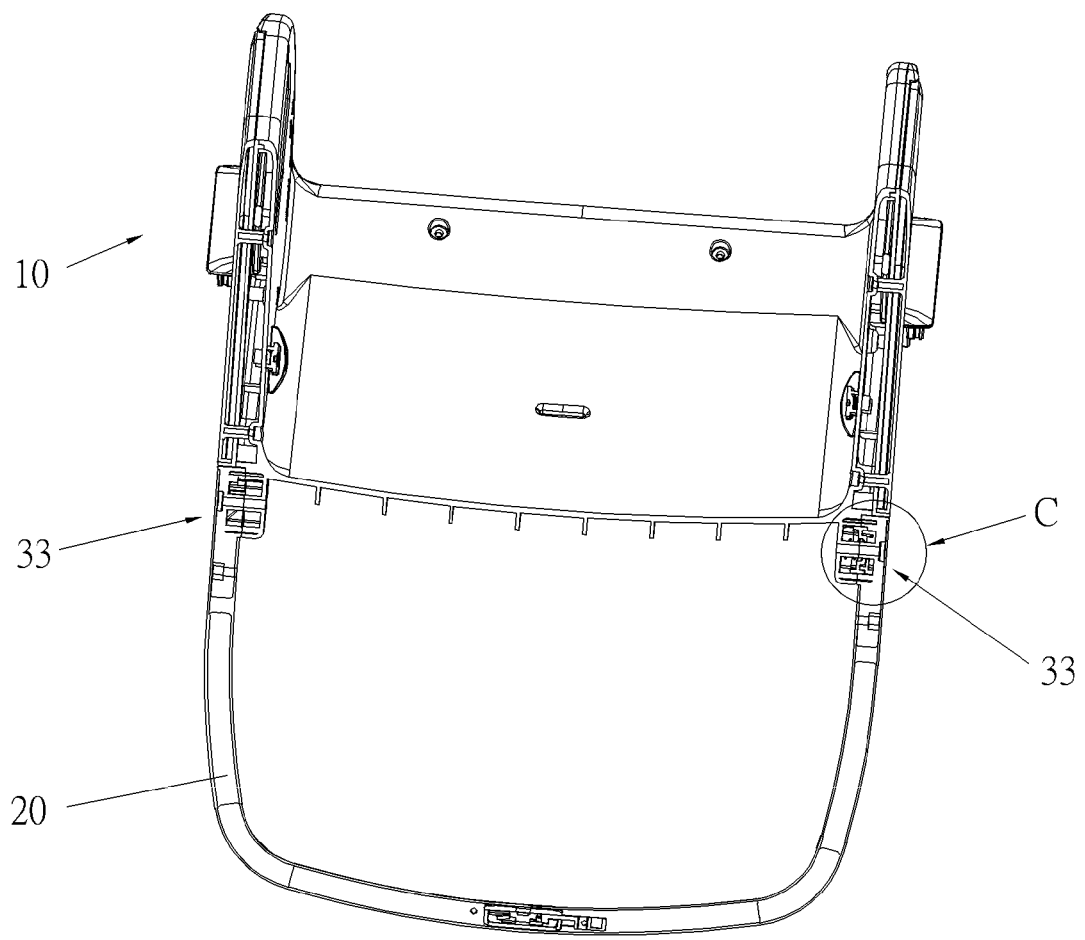
FIG. 10 is a diagram of the lower leg rest adjusting device with the lower leg rest fixed with a body of the infant carrier according to the first embodiment of the present invention.
Figure 11:
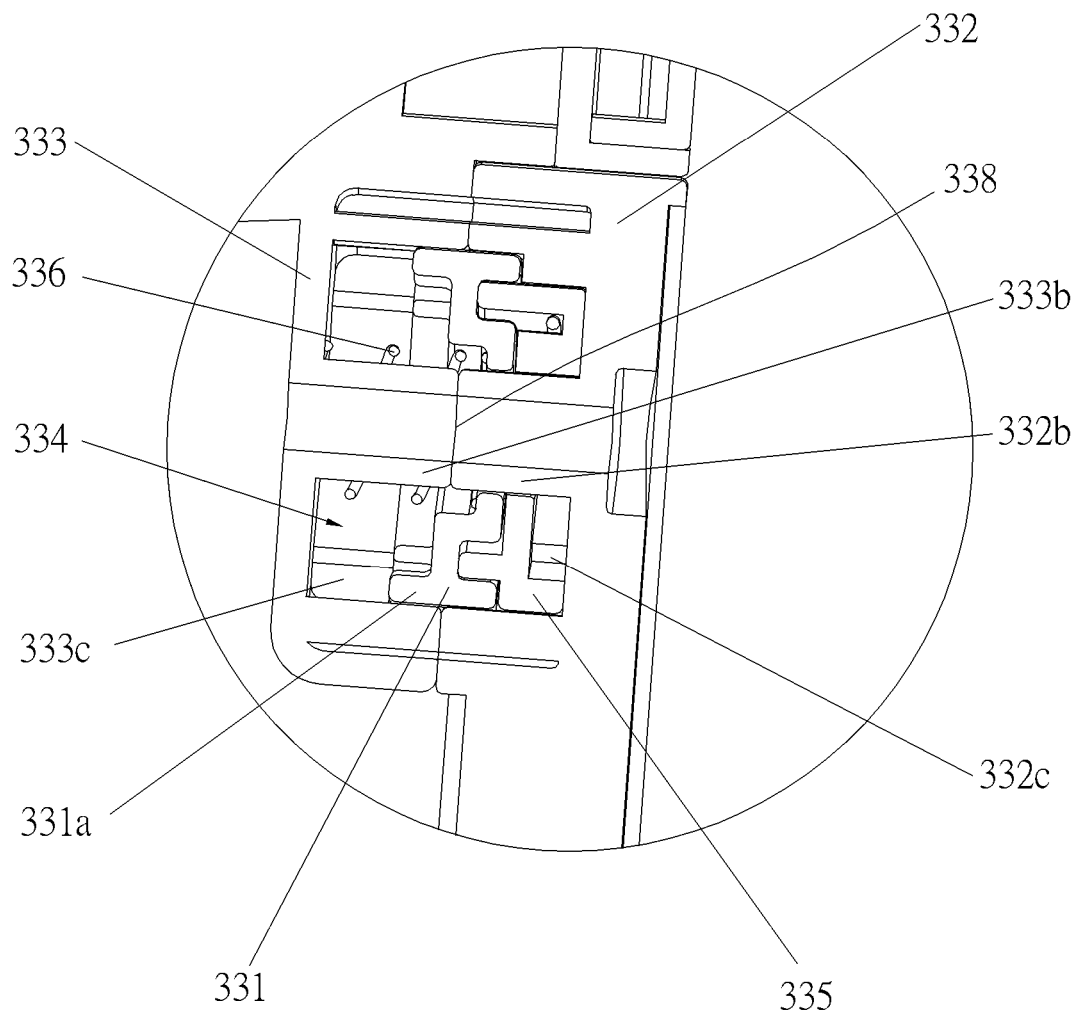
FIG. 11 is an enlarged diagram of area C shown in FIG. 10 according to the first embodiment of the present invention.
Figure 12:
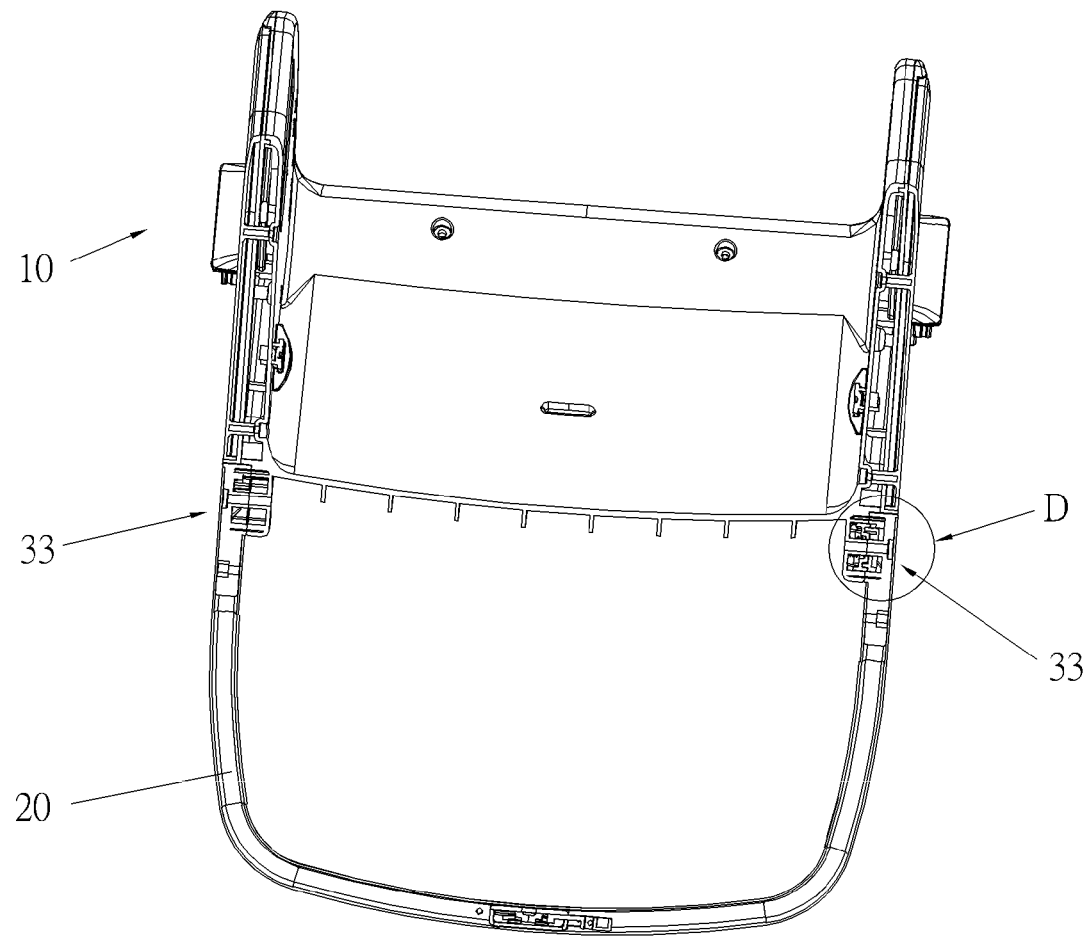
FIG. 12 is a diagram of the lower leg rest adjusting device with the lower leg rest released from the body of the infant carrier according to the first embodiment of the present invention.
Figure 13:
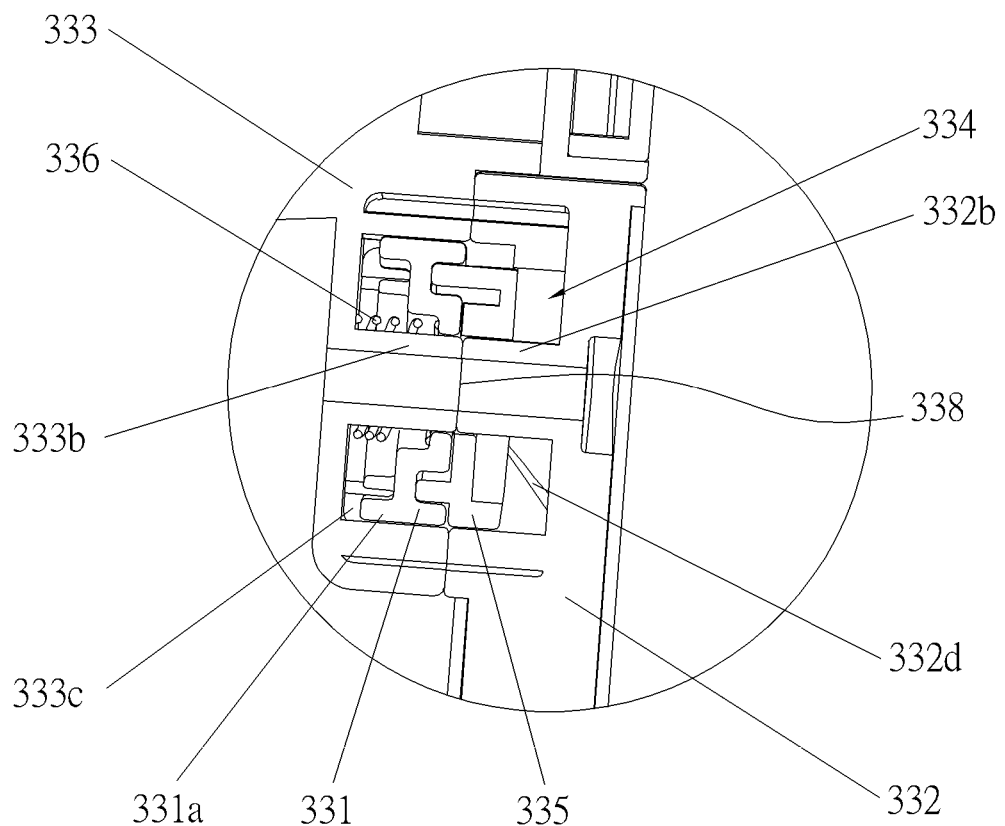
FIG. 13 is an enlarged diagram of area D shown in FIG. 12 according to the first embodiment of the present invention.

Please refer to FIG. 10 to FIG. 13. FIG. 10 is a diagram of the lower leg rest adjusting device 30 with the lower leg rest 20 fixed with a body 10 of the infant carrier 100 according to the first embodiment of the present invention. FIG. 11 is an enlarged diagram of area C shown in FIG. 10 according to the first embodiment of the present invention. FIG. 12 is a diagram of the lower leg rest adjusting device 30 with the lower leg rest 20 released from the body 10 of the infant carrier 100 according to the first embodiment of the present invention. FIG. 13 is an enlarged diagram of area D shown in FIG. 12 according to the first embodiment of the present invention.

Preferably, each angle-fixing structure 33 includes an engaging component 331, a first base 332 and a second base 333 engaged with the first base 332, as shown in FIG. 3 and FIG. 4. The first base 332 is connected to the lower leg rest 20, and more specifically, the first base 332 is inserted into an end of the lower leg rest 20. The second base 333 is connected to the body 10, and more specifically, the second base 333 is fixed on the body 10 and integrated with the body 10. A containing chamber 334 is formed by engaging the first base 332 with the second base 333 along a horizontal direction, and the engaging component 331 is contained in the containing chamber 334, as shown in FIG. 11.

In addition, please refer to FIG. 3 to FIG. 6. the first base 332 includes a first engaging portion 332a stretching into the containing chamber 334 for engaging with a side of the engaging component 331, the second base 333 includes a second engaging portion 333a stretching into the containing chamber 334 for engaging with the other side of the engaging component 331, the second engaging portion 333a is opposite to the first engaging portion 332a, the engaging component 331 is selectively engaged with the first engaging portion 332a. Specifically, a plurality of first engaging pieces 332c is protruded out of the first base 332 and spaced annularly to form the first engaging portion 332a, and the first engaging pieces 332c are preferably stretching into the containing chamber 334. A plurality of second engaging pieces 333c is protruded out of the second base 333 and spaced annularly to form the second engaging portion 333a, and the second engaging pieces 333c are preferably stretching into the containing chamber 334. An engaging protrusion 331a is disposed on the engaging component 331 and engaged with the first engaging portion 332a and the second engaging portion 333a, so that the engaging component 331 is reliably engaged with the first engaging portion 332a and the second engaging portion 333a.

As the engaging component 331 is only engaged with the second engaging portion 333a, that is, the engaging component 331 detaches from the first engaging portion 332a, the pair of angle-fixing structures 33 release the lower leg rest 20, and the lower leg rest 20 can pivot relative to the body 10 by the pair of angle-fixing structures 33 for adjusting the angle of the lower leg rest 20. As the engaging component 331 engages with the first engaging portion 332a and the second engaging portion 333a, the pair of angle-fixing structures 33 can fix the lower leg rest 20 on the body 10.

More specifically, as shown in FIG. 4 and FIG. 6, each angle-fixing structure 33 includes a pushing component 335 and a resilient component 336. The pushing component 335 is pivotally contained in the containing chamber 334 and aligned with the engaging component 331, and the resilient component 336 is connected to the engaging component 331 and an inner sidewall of the second base 333. The first base 332 further includes a pushing portion 332d, and the pushing portion 332d is preferably formed on the inner sidewall of the first base 332. A withstanding portion 335a is disposed on the pushing component 335 corresponding to the pushing portion 332d, and the linking component 32 is connected to the corresponding pushing component 335.

As the linking component 32 pulls the corresponding pushing component 335 to pivot on a first sheathing pillar 332b of the first base 332, the pushing portion 332d engages with the withstanding portion 335a, the movement of the pivoting pushing component 335 is transferred to the movement of the pushing component 335 toward the second base 333 so that the engaging component 331 detaches from the first engaging portion 332a, and the pair of angle-fixing structures 33 release the lower leg rest 20 for adjusting to the angle of the lower leg rest 20 relative to the body 10.

For conveniently installing and disposing the resilient component 336, the engaging component 331 and the pushing component 335 in the containing chamber 334, a sheathing portion 338 is disposed in the containing chamber 334, and the resilient component 336, the engaging component 331 and the pushing component 335 sheathes the sheathing portion 338 sequentially, as shown in FIG. 11 to FIG. 13. Preferably, according to the first embodiment, the first base 332 includes a first sheathing pillar 332b stretching toward the second base 333 into the containing chamber 334, the second base 333 includes a second sheathing pillar 333b stretching toward the first base 332 into the containing chamber 334, and the first sheathing pillar 332b and the second sheathing pillar 333b are connected to form the sheathing portion 338 to simplify the structure of the sheathing portion 338. Preferably, the first sheathing pillar 332b and the second sheathing pillar 333b are straight connected, the plurality of first engaging pieces 332c is spaced annularly to form the first engaging portion 332a, and the plurality of second engaging pieces 333c is spaced annularly to form the second engaging portion 333a. The arrangement of the plurality of first engaging pieces 332c and the plurality of second engaging pieces 333c are more reasonable, and the engagement between the engaging component 331 with the plurality of first engaging pieces 332c and the plurality of second engaging pieces 333c are more reliable.

In addition, as shown in FIG. 4 and FIG. 6, a third inclined surface 332e is formed on the pushing portion 332d, and a fourth inclined surface 335b is formed on the withstanding portion 335a correspondingly for contacting against the third inclined surface 332e, so that the pushing component 335 drives the engaging component 331 to move toward the second base 333 more reliably for detaching the engaging component 331 from the first engaging portion 332a by the engagement of the third inclined surface 332e and the fourth inclined surface 335b when the pushing component 335 pivots, and the pair of angle-fixing structures 33 since release the lower leg rest 20.

Please refer to FIG. 1 to FIG. 13, the operation of the lower leg rest adjusting device 30 of the infant carrier 100 is introduced in detail as the following according to the first embodiment of the present invention. When adjusting the angle between the lower leg rest 20 and the body 10, the operating component 31 is pushed to slide toward the horizontal frame 20a of the lower leg rest 20. The sliding operating component 31 contacts the first inclined surface 31a to engage with the second inclined surface 34a for driving the pair of driving components 34 to move close to each other so that each driving component 34 drives the corresponding linking component 32. The linking component 32 pulls the corresponding pushing component 335 to pivot on the sheathing portion, the third surface 332e of the pushing portion 332d engages with the fourth surface 335b of the withstanding portion 335a so as to push pushing component 335 to move in a direction far away from the pushing portion 332d for driving the engaging component 331 to move in the direction far away from the pushing portion 332d with the pushing component 335, and the resilient component 336 is pressed for providing restoring force to the engaging component 331 when the engaging component 331 moves.

As the pushing component 335 keeps moving in the direction far away from the pushing portion 332d, the engaging component 331 detaches from the engaging portion 332a of the first base 332 to be in the status shown in FIG. 13. Because the engaging component 331 moves inward the second base 333, the second engaging portion 333a of the second base 333 keeps engaging with the engaging component 331 so that the pair of the angle-fixing structures 33 release the lower leg rest 20. Since the lower leg rest 20 is able to pivot relative to the body 10, the angle of the lower leg rest 20 is adjustable therefore.

When the adjustment of the angle of the lower leg rest 20 is completed, the operating component 31 is released. The engaging components 331 disposed on both sides of the lower leg rest 20 are restored respectively to engage with the corresponding first engaging portion 332a of the first base 332 so that the angle-fixing structures 33 fix the lower leg rest 20 to complete adjusting the angle of the lower leg rest 20. Accordingly, the third inclined surface 332e engages with the fourth inclined surface 335b, the restoring movements of the engaging components 331 are transferred to the pivoting movements of the pushing components 335. The pivoting pushing components 335 pull the pair of linking components 32 to drive the pair of driving component 34 move far away form each other synchronously, and the first inclined surface 31a engages with the second inclined surface 34a so as to push the operating component 31 out of an opening 21 of the lower leg rest 20 for restoring the operating component 31. But not limited to this, a resilient component can be disposed between the operating component 31 and the installation holder 35 for restoring the operating component 31 of the present invention.

Figure 14:
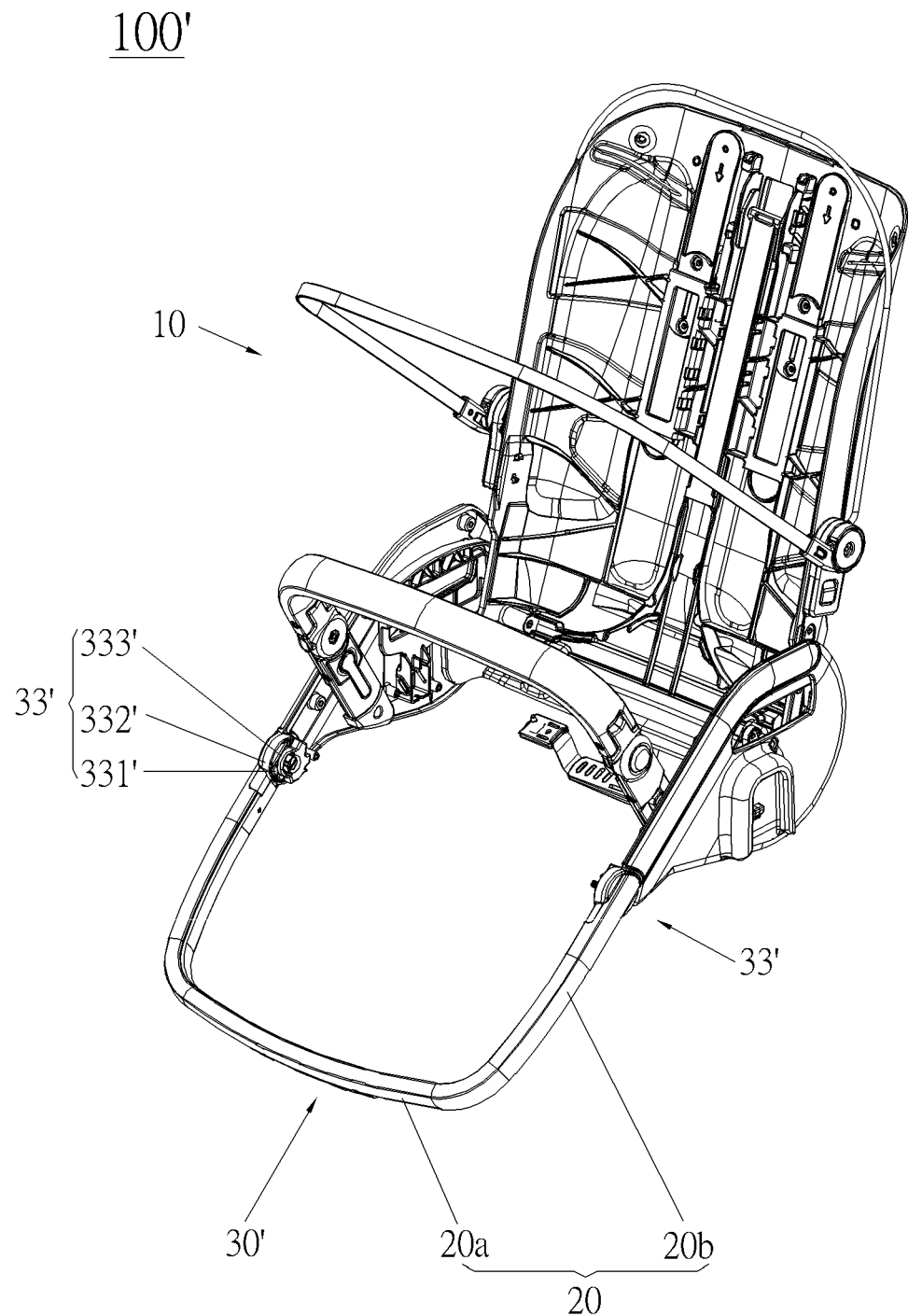
FIG. 14 is a partial schematic drawing of an infant carrier according to a second embodiment of the present invention.

Please refer to FIG. 14. FIG. 14 is a partial schematic drawing of an infant carrier 100' according to a second embodiment of the present invention. A difference between the infant carrier 100' according to the second embodiment and the infant carrier 100 according to the first embodiment is that the pair of the angle-fixing structures 33' of a lower leg rest adjusting device 30' according to the second embodiment is different from the pair of the angle-fixing structures 33 of the lower leg rest adjusting device 30 according to the first embodiment. The structure of the pair of angle-fixing structures 33' of the lower leg rest adjusting device 30' is introduced in detail as the following description.

Figure 15:
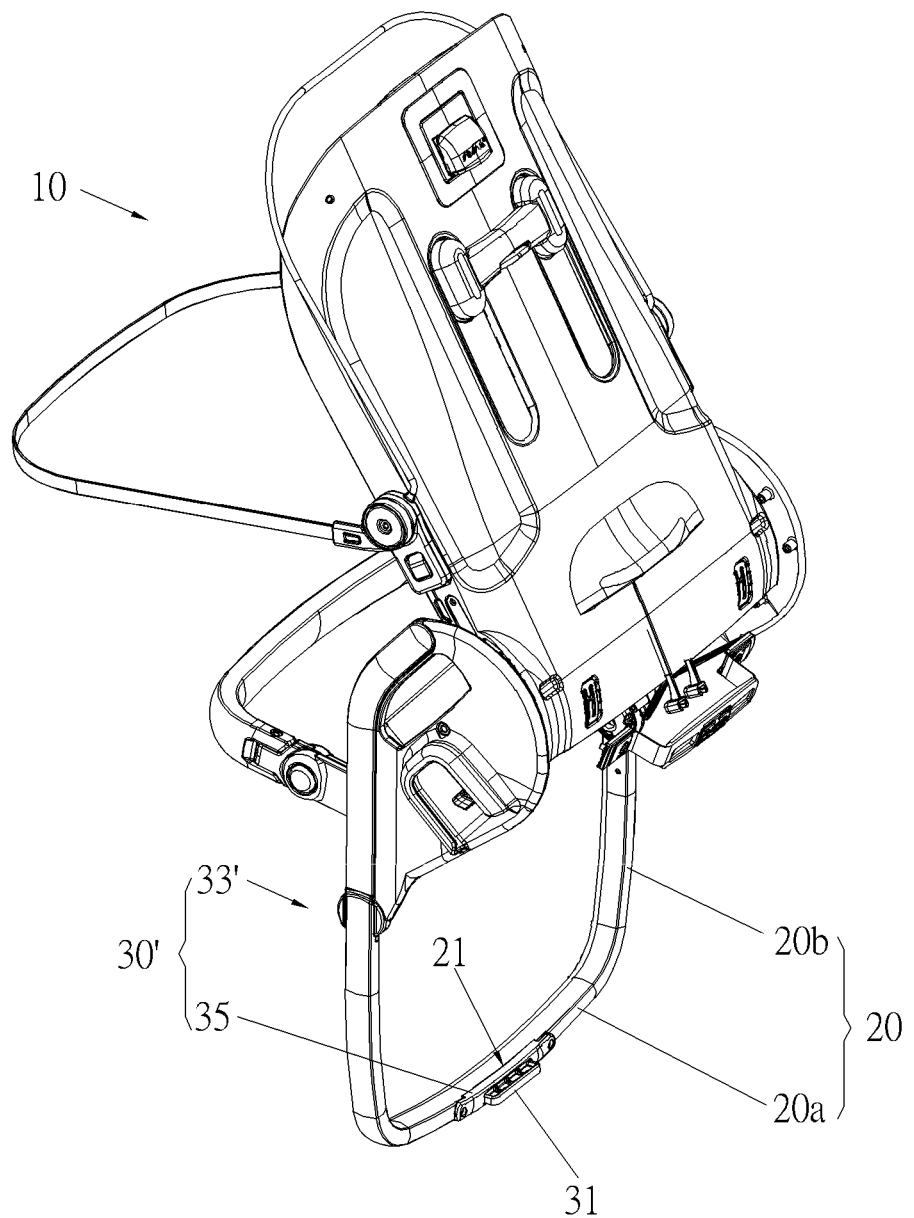
FIG. 15 is a schematic drawing of the infant carrier in FIG. 14 in a different view angle according to the second embodiment of the present invention.
Figure 16:
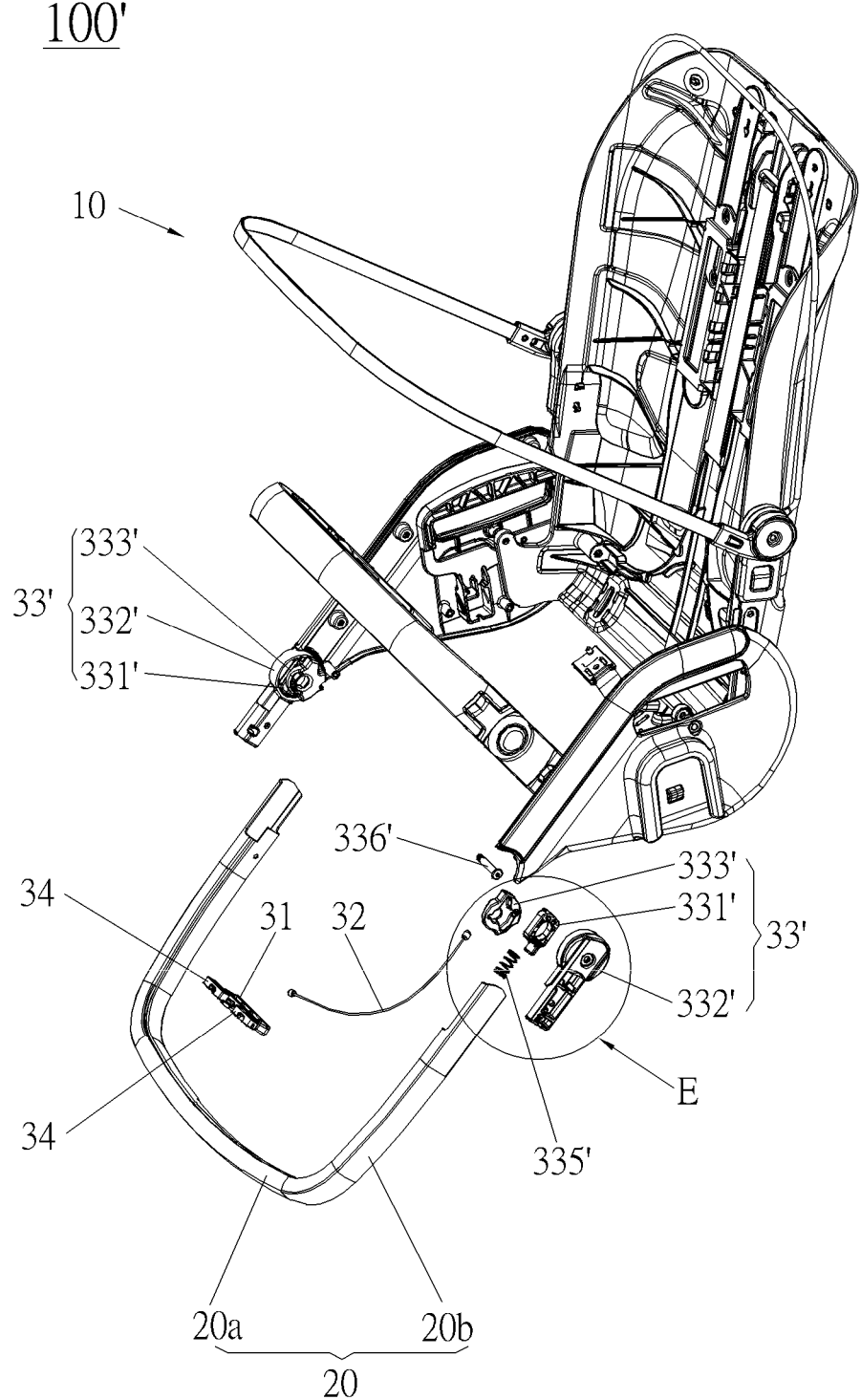
FIG. 16 is an exploded diagram of the infant carrier in FIG. 14 according to the second embodiment of the present invention.
Figure 17:
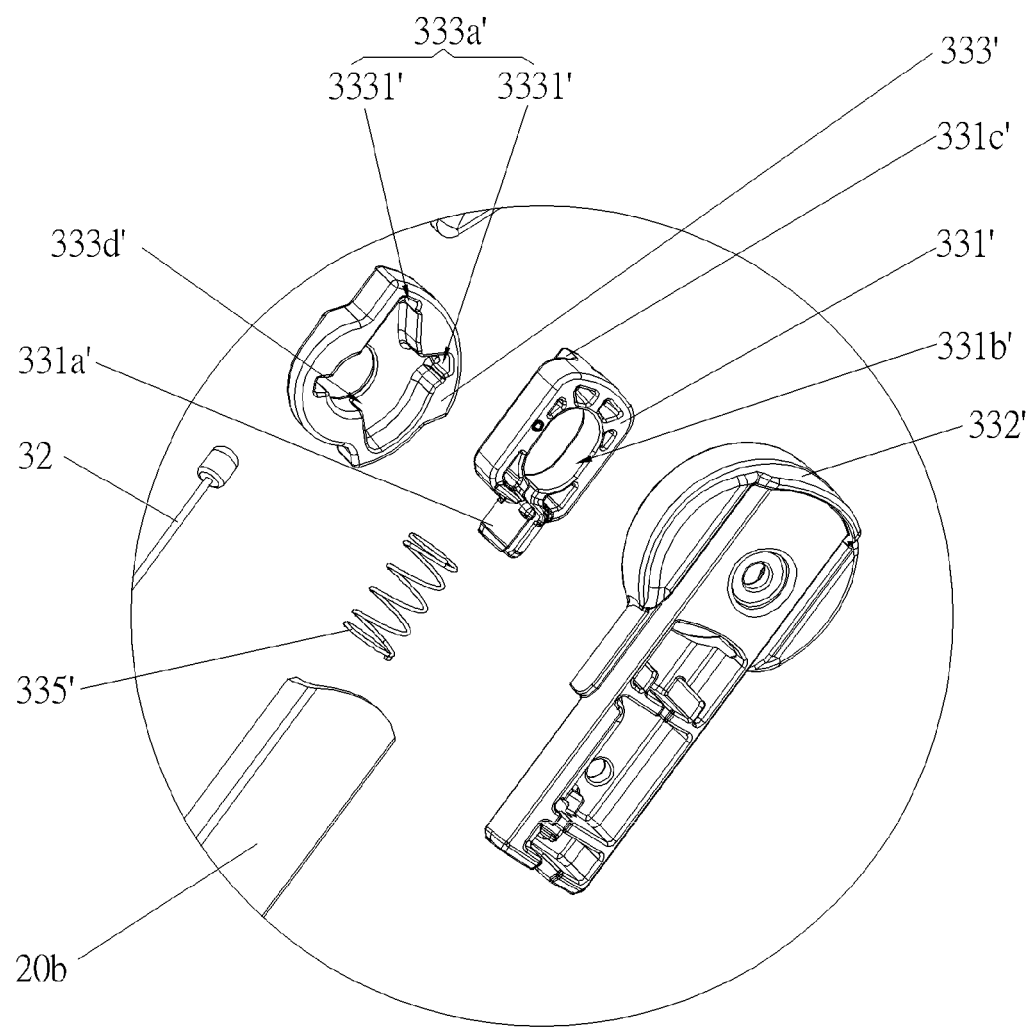
FIG. 17 is an enlarged diagram of area E shown in FIG. 16 according to the second embodiment of the present invention.
Figure 18:
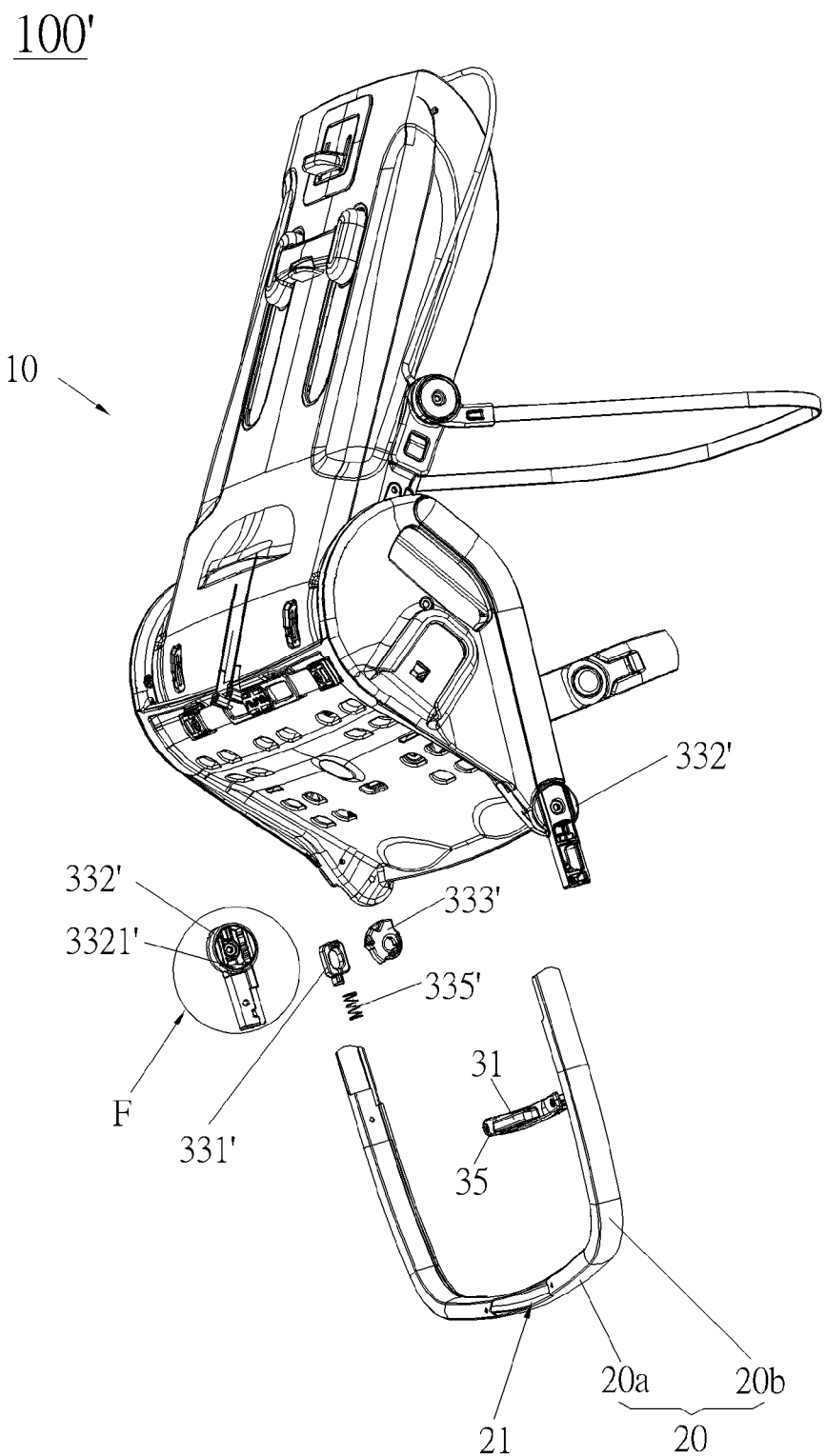
FIG. 18 is an exploded diagram of the infant carrier in FIG. 14 in a different view angle according to the second embodiment of the present invention.
Figure 19:
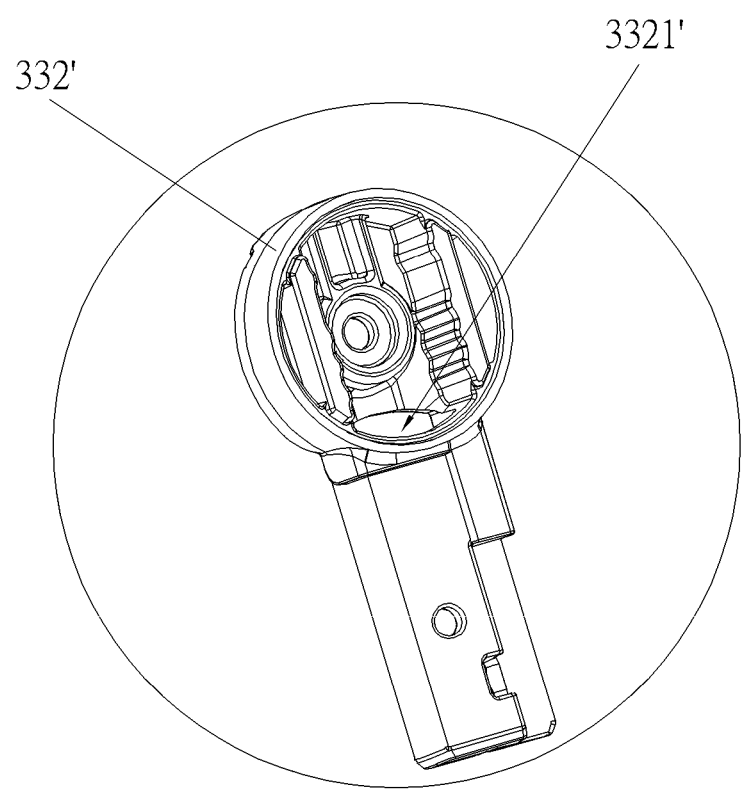
FIG. 19 is an enlarged diagram of area F shown in FIG. 18 according to the second embodiment of the present invention.
Figure 20:
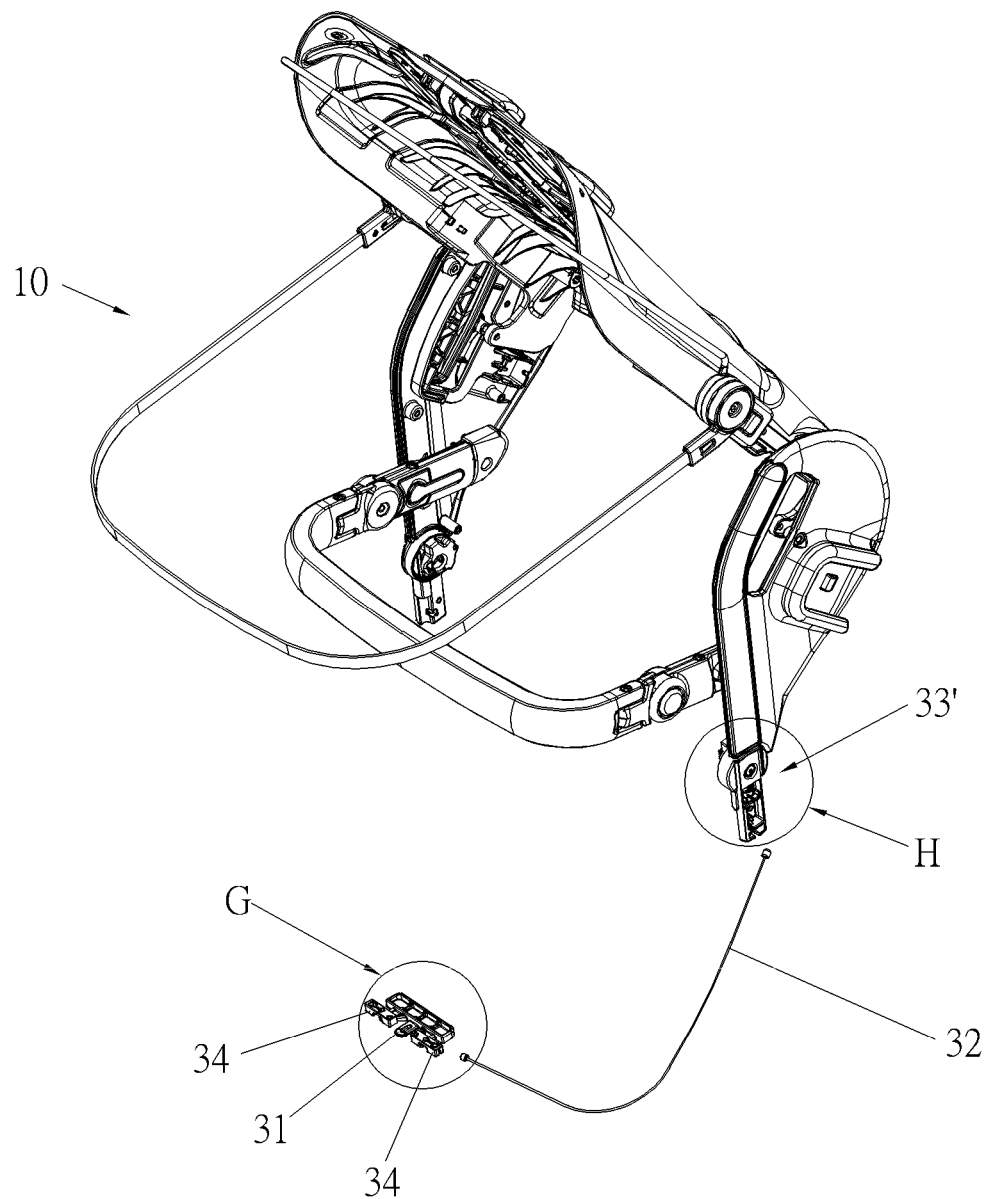
FIG. 20 is an exploded diagram of the infant carrier in FIG. 14 with a lower leg rest according to the second embodiment of the present invention.
Figure 21:
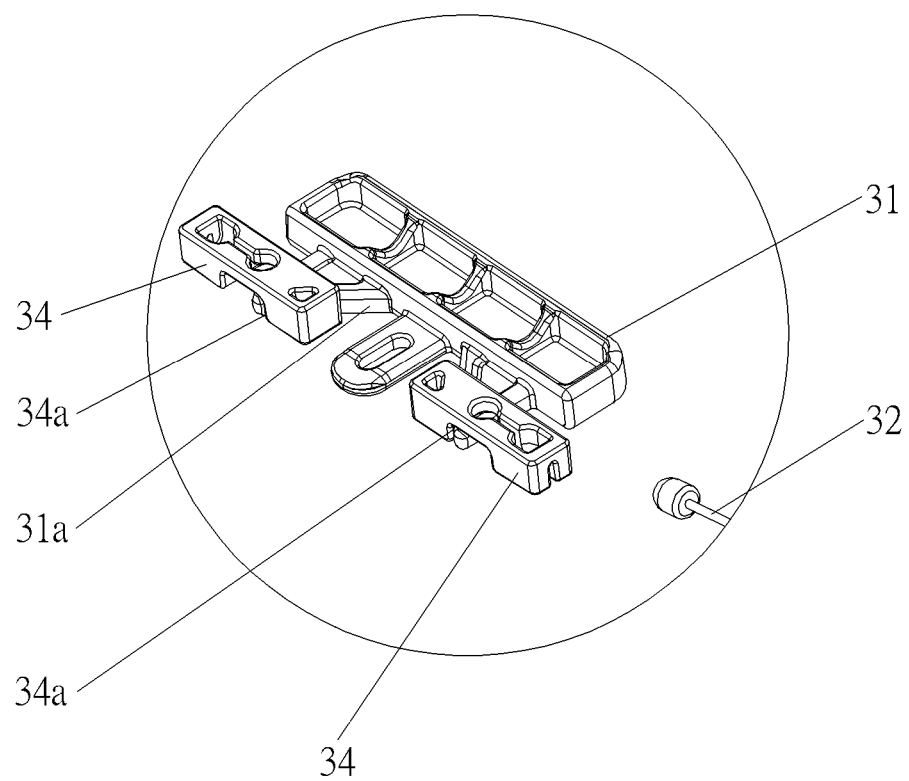
FIG. 21 is an enlarged diagram of area G shown in FIG. according to the second embodiment of the present invention.
Figure 22:
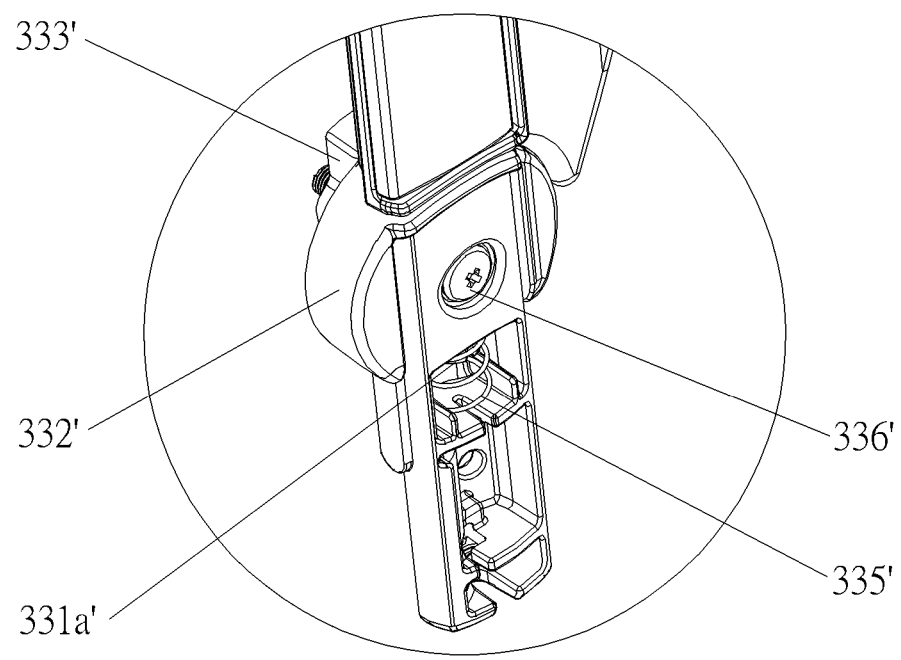
FIG. 22 is an enlarged diagram of area H shown in FIG. 20 according to the second embodiment of the present invention.
Figure 23:
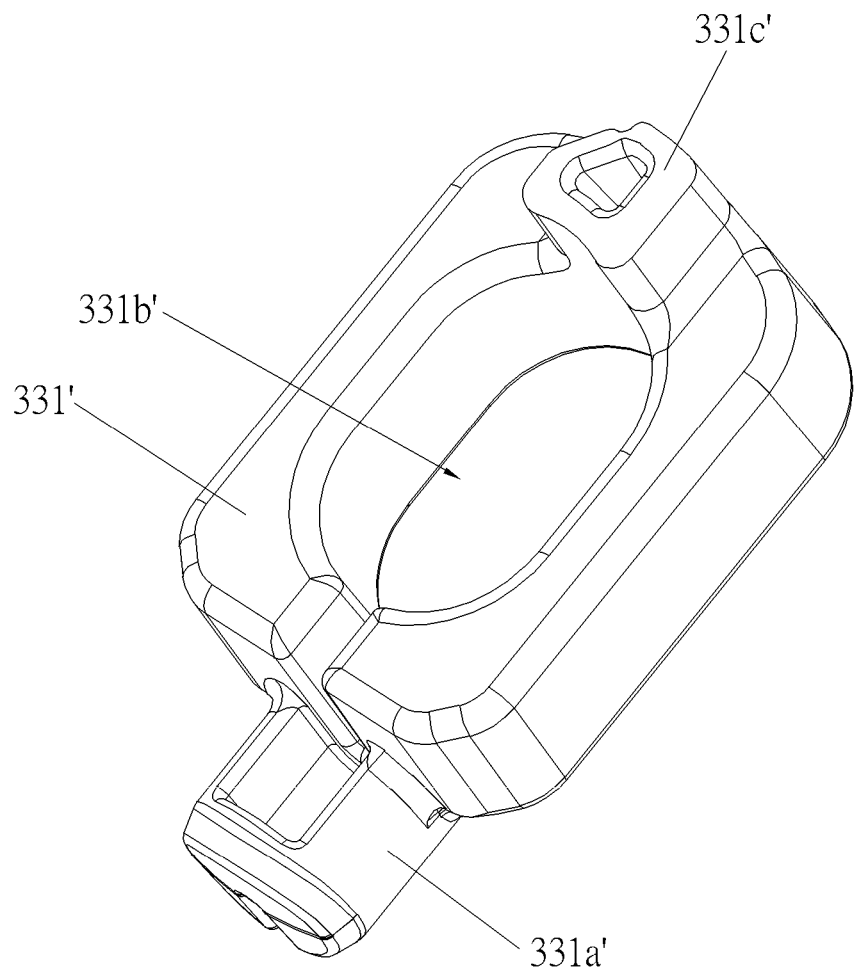
FIG. 23 is a diagram of an engaging component of the angle-fixing structure of the lower leg rest adjusting device according to the second embodiment of the present invention.

Please refer to FIG. 15 to FIG. 23. FIG. 15 is a schematic drawing of the infant carrier 100' in FIG. 14 in a different view angle according to the second embodiment of the present invention. FIG. 16 is an exploded diagram of the infant carrier 100 in FIG. 14 according to the second embodiment of the present invention. FIG. 17 is an enlarged diagram of area E shown in FIG. 16 according to the second embodiment of the present invention. FIG. 18 is an exploded diagram of the infant carrier 100' in FIG. 14 in a different view angle according to the second embodiment of the present invention. FIG. 19 is an enlarged diagram of area F shown in FIG. 18 according to the second embodiment of the present invention. FIG. 20 is an exploded diagram of the infant carrier 100' in FIG. 14 with a lower leg rest 20 according to the second embodiment of the present invention. FIG. 21 is an enlarged diagram of area G shown in FIG. 20 according to the second embodiment of the present invention. FIG. 22 is an enlarged diagram of area H shown in FIG. 20 according to the second embodiment of the present invention. FIG. 23 is a diagram of an engaging component 331' of the angle-fixing structure 33' of the lower leg rest adjusting device 30' according to the second embodiment of the present invention.

According to the second embodiment, each angle-fixing structure 33' includes an engaging component 331', a first base 332' and a second base 333' engaged with the first base 332'. The first base 332' is connected to the lower leg rest 20, and more specifically, the first base 332' is inserted into a side frame 20b of the lower leg rest 20 for conveniently detaching the first base 332' from the lower leg rest 20. The second base 333' is connected to the body 10', and more specifically, the second base 333' is fixed on the body 10' and integrated with the body 10'. A containing chamber, which is unlabeled in figures, is formed by engaging the first base 332' with the second base 333' along a horizontal direction, and the engaging component 331' is contained in the containing chamber.

Specifically, according to the second embodiment, the second base 333' includes a stepping locking portion 333a' disposed in the containing chamber, and the engaging component 331' is slidably installed between the first base 332' and the second base 333'. Preferably, a radial constraining sliding slot 3321' is disposed on the first base 332', the engaging component 331' is slidably installed in the radial constraining sliding slot 3321' so as to prevent the engaging component 331' to pivot and interfere with the unlocking operation. The engaging component 331' is selectively to engage with the stepping locking portion 333a' for conveniently engaging with the second base 333' so as to adjust the angle between the first base 332' and the second base 333'. That is, the linking component 32 drives the engaging component 331 to slide on the first base 332' to detach from the second base 333'. The first base 332' and the second base 333' can pivot relative to each other so as to adjust the angle of the lower leg rest 20 relative to the body 10.

Preferably, a sliding direction of the engaging component 331' and a pivotal axis of the first base 332' and the second base 333' are intersected so that the engaging component 331' is slidably engaged with or detached from the stepping locking portion 333a' for easy operating the engaging component 331' to be locked or unlocked. According to the second embodiment, the second base 333' preferably includes at least two locking portions 3331' disposed in the containing chamber. It preferably disposes two locking portions 3331' in the containing chamber of the second base 333', and it also can optionally dispose three, four or five locking portions 3331', but not limited to this. The locking portions 3331' are spaced along a pivoting direction of the lower leg rest 20 to form the stepping locking portion 333a' to simplify a structure of the stepping locking portion 333a'.

Accordingly, the locking portion 3331' includes a fastening portion 331c' selectively engaged with the locking portion 3331' for easily engaging the engaging component 331' with the second base 333'.

Specifically, the locking portion 3331' is a sunken slot and the fastening portion 331c' is a protrusion for simplify a structure of the locking portion 3331' and a structure of the fastening portion 331c'. A pivotal chamber 333d' is disposed on the second base 333' communicated with the sunken slot for providing pivoting space for the protrusion so as to prevent the protrusion from hindering the second base 333' and interfering the angle adjustment of the first base 332' and the second base 333'. Besides, the locking portion 3331' can optionally be a protrusion, the fastening portion 331c' can optionally be a sunken slot to achieve the above-mentioned engagement.

According to the second embodiment, each angle-fixing structure 33' further includes a resilient component 335' for automatically restoring the engaging component 331' as the engaging component 331' is unlocked. An end of the resilient component 335' is connected to the engaging component 331', and the other end of the resilient component 335' is connected to the first base 332'. According to the second embodiment, the other end of the resilient component 335' is directly connected to the first base 332' for easily and reliably restoring the engaging component 331'.

For conveniently assembling the engaging component 331' with the resilient component 335', the engaging component 331' includes a sheathing protrusion 331a'. For reliably pivot of the first base 332' and the second base 333', each angle-fixing structure 33' further includes a pivotal shaft 336' according to the second embodiment. The pivotal shaft 336' passes through the first base 332', an end of the pivotal shaft 336' is connected to the first base 332', the other end of the pivotal shaft 336' is connected to the second base 333', and the engaging component 331' is engaged with the pivotal shaft 336' with a gap. Preferably, a sliding opening 331b' is disposed on the engaging component 331' for the pivotal shaft 336' to pass though, the pivotal shaft 336' is inserted in the sliding opening 331b' with a gap so that the engaging component 331' slides relative to the pivotal shaft 336' disposed in the engaging component 331' for engaging with or detaching from the stepping locking portion 333a'.

Please refer to FIG. 14 to FIG. 23, the operation of the lower leg rest adjusting device 30' of the infant carrier 100' is introduced in detail according to the second embodiment of the present invention in following. The similar operation of the first embodiment and the second embodiment is not reiterated. As for the operation of the linking component 32 for driving the engaging component 331' to detach from the stepping locking portion 333a' and for restoring the engaging component 331' to engage with the stepping locking portion 333a' is introduced as follows. The linking component 32 drives the engaging component 331' to slide between the first base 332' and the second base 333' for detaching from one of the locking portion 3331' of the stepping locking portion 333a' as adjusting the angle of the lower leg rest 20 relative to the body 10. The sliding engaging component 331' drives the fastening portion 331c' to detach from the locking portion 3331' of the stepping locking portion 333a' so that the engaging component 331' releases from the second base 333'. The first base 332' and the second base 333' can pivot relative to each other, and the resilient component 335' is pressed for restoring the engaging component 331'. The linking component 32 keeps linking the engaging component 331' to pivot the lower leg rest 20 in an angle relative to the body 10, the fastening portion 331c' of the engaging component 331' faces to another locking portion 3331' of the stepping locking portion 333a'. And then the linking component 32 releases the engaging component 331', the engaging component 331' is restored by the resilient component 335' so that the fastening portion 331c' engages with the locking portion 3331' facing to the fastening portion 331c', and the engaging component 331' is locked with the second body 333' again. At this time, the first base 332' cannot pivot on the second base 333' for preventing the lower leg rest 20 from releasing from the body 10 after being adjusted, so as to ensure the reliability of the adjustment of the lower leg rest 20 and the body 10.

In conclusion, the both ends of the lower leg rest are pivoted to the body by the corresponding angle-fixing structures, the angle-fixing structures are selectively engaged with the lower leg rest, the end of each linking component is connected to the operating component, and the other end of each linking component is connected to the corresponding angle-fixing structures. As a user operates the operating component with one hand, the operating component drives each linking component to pull the corresponding angle-fixing structures to release from the end of the lower leg rest so as to adjust the angle of the lower leg rest. Therefore, the lower leg rest adjusting devices and the infant carrier therewith of the present invention are capable of adjusting the angle of the lower leg rest with one hand rapidly and conveniently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lower leg rest adjusting device for adjusting an angle of a lower leg rest pivoted to a body of an infant carrier, the lower leg rest adjusting device comprising:
   - an operating component;
   - a pair of angle-fixing structures, two ends of the lower leg rest being pivoted to the body by the pair of angle-fixing structures, and the pair of angle-fixing structures being selectively engaged with the lower leg rest;
   - a pair of linking components, an end of each linking component being connected to the operating component, the other end of each linking component being connected to the corresponding angle-fixing structure, the operating component driving the pair of linking components to pull the pair of angle-fixing structures to be unlocked from the lower leg rest so as to adjust the angle of the lower leg rest;
   - a pair of driving components, the operating component being slidably disposed on the lower leg rest, the pair of driving components being disposed on two opposite sides of the operating component respectively, each of the pair of driving components being connected to the corresponding linking component, and the operating component sliding inward with respect to the lower leg rest to drive the pair of driving components to move close to each other, wherein the operating component comprises two first inclined surfaces, each of the pair of driving components comprises a second inclined surface, and the first inclined surfaces and the second inclined surfaces contact against each other; and
   - an installation holder, the operating component being slidably disposed in the installation holder, an end of the operating component being protruded out of the installation holder, contacting inclined surfaces of the driving components and the operating component being disposed inside the installation holder, and the linking component being disposed inside the lower leg rest;
   - wherein the operating component comprises an anti-release protrusion, the anti-release protrusion contacting against the installation holder as the operating component slides in a direction far away from the lower leg rest and the anti-release protrusion preventing the operating component from detaching from the installation holder when the anti-release protrusion contacts the installation holder.

2. The lower leg rest adjusting device of claim 1, wherein a line extending from a sliding direction of the operating component intersects with a line extending from a sliding direction of the driving components.

3. The lower leg rest adjusting device of claim 1, wherein each angle-fixing structure comprises an engaging component, a first base and a second base engaged with the first base, the first base is connected to the lower leg rest, the second base is connected to the body, a containing chamber is formed by engaging the first base with the second base along a horizontal direction, and the engaging component is contained in the containing chamber.

4. The lower leg rest adjusting device of claim 3, wherein the first base comprises a first engaging portion stretching into the containing chamber for engaging with a side of the engaging component, the second base comprises a second engaging portion stretching into the containing chamber for engaging with the other side of the engaging component, the second engaging portion is opposite to the first engaging portion, the engaging component is selectively engaged with the first engaging portion, the pair of angle-fixing structures release the lower leg rest when the engaging component detaches from the first engaging component, and the pair of angle-fixing structures fix the lower leg rest when the engaging component engages with the first engaging portion and the second engaging portion.

5. The lower leg rest adjusting device of claim 4, wherein each angle-fixing structure comprises a pushing component and a resilient component, the pushing component is pivotally contained in the containing chamber and arranged with the engaging component, the resilient component is connected to the engaging component and the second base, the first base further comprises a pushing portion, a withstanding portion is disposed on the pushing component corresponding to the pushing portion, the linking component is connected to the corresponding pushing component, the pushing portion engages with the withstanding portion so that the pushing component drives the engaging component to move toward the second base for detaching from the first engaging portion when the linking component pulls the corresponding pushing component to pivot.

6. The lower leg rest adjusting device of claim 5, wherein a sheathing portion is disposed in the containing chamber, and the resilient component, the engaging component and the pushing component sheathes the sheathing portion sequentially.

7. The lower leg rest adjusting device of claim 6, wherein the first base comprises a first sheathing pillar stretching toward the second base into the containing chamber, the second base comprises a second sheathing pillar stretching toward the second base into the containing chamber, and the first sheathing pillar and the second sheathing pillar are connected to form the sheathing portion.

8. The lower leg rest adjusting device of claim 5, wherein a third inclined surface is formed on the pushing portion, and a fourth inclined surface is formed on the withstanding portion correspondingly for contacting against the third inclined surface.

9. The lower leg rest adjusting device of claim 4, wherein a plurality of first engaging pieces is protruded out of the first base and spaced annularly to form the first engaging portion, and a plurality of second engaging pieces is protruded out of the second base and spaced annularly to form the second engaging portion.

10. The lower leg rest adjusting device of claim 3, wherein the second base comprises a stepping locking portion disposed in the containing chamber, the engaging component is slidably installed between the first base and the second base, and the engaging component is selectively engaged with the stepping locking portion.

11. The lower leg rest adjusting device of claim 10, wherein a line extending from a sliding direction of the engaging component intersects with a line extending from a pivotal axis of the first base and the second base.

12. The lower leg rest adjusting device of claim 11, wherein the second base comprises at least two locking portions disposed in the containing chamber, and the at least two locking portions are spaced along a pivoting direction of the lower leg rest to form the stepping locking portion.

13. The lower leg rest adjusting device of claim 12, wherein the engaging component comprises a fastening portion selectively engaged with one of the least two locking portions.

14. The lower leg rest adjusting device of claim 13, wherein one of the locking portion and the fastening portion is a sunken slot and the other of the locking portion and the fastening portion is a protrusion.

15. The lower leg rest adjusting device of claim 11, wherein each angle-fixing structure further comprises a resilient component, an end of the resilient component is connected to the engaging component, and the other end of the resilient component is connected to the first base.

16. The lower leg rest adjusting device of claim 11, wherein each angle-fixing structure further comprises a pivotal shaft, and the pivotal shaft passes through the first base, the engaging component and the second base.

17. The lower leg rest adjusting device of claim 16, wherein a sliding opening is disposed on the engaging component, and the pivotal shaft is inserted in the sliding opening.

18. The lower leg rest adjusting device of claim 1, wherein the lower leg rest comprises a horizontal frame and two side frames connected to the horizontal frame, and the operating component is disposed on the horizontal frame.

19. The lower leg rest adjusting device of claim 18, wherein an opening is formed on the horizontal frame, and the operating component passes though the opening to be slidably disposed on the horizontal frame.

20. The lower leg rest adjusting device of claim 1, wherein when the operating component slides inward with respect to the lower leg rest to drive the pair of driving components to move close to each other, the operating component slides inward in a direction perpendicular to the longitudinal direction of the lower leg rest.

21. An infant carrier comprising:
a body;
a lower leg rest pivoted to the body; and
a lower leg rest adjusting device for adjusting an angle of the lower leg rest, the lower leg rest adjusting device comprising:
an operating component;
a pair of angle-fixing structures, two ends of the lower leg rest being pivoted to the body by the pair of angle-fixing structures, and the pair of angle-fixing structures being selectively engaged with the lower leg rest;
a pair of linking components, an end of each linking component being connected to the operating component, the other end of each linking component being connected to the corresponding angle-fixing structure, the operating component driving the pair of linking components to pull the pair of angle-fixing structures to be unlocked from the lower leg rest so as to adjust the angle of the lower leg rest;
a pair of driving components, the operating component being slidably disposed on the lower leg rest, the pair of driving components being disposed on two opposite sides of the operating component respectively, each of the pair of driving components being connected to the corresponding linking component, and the operating component sliding inward with respect to the lower leg rest to drive the pair of driving components to move close to each other, wherein the operating component comprises two first inclined surfaces, each of the pair of driving components comprises a second inclined surface, and the first inclined surfaces and the second inclined surfaces contact against each other; and an installation holder, the operating component being slidably disposed in the installation holder, an end of the operating component being protruded out of the installation holder, contacting inclined surfaces of the driving components and the operating component being disposed inside the installation holder, and the linking component being disposed inside the lower leg rest;

wherein the operating component comprises an anti-release protrusion, the anti-release protrusion contacting against the installation holder as the operating component slides in a direction far away from the lower leg rest and the anti-release protrusion preventing the operating component from detaching from the installation holder when the anti-release protrusion contacts the installation holder.

22. The infant carrier of claim 21, wherein a line extending from a sliding direction of the operating component intersects with a line extending from a sliding direction of the driving components.

23. The infant carrier of claim 21, wherein each angle-fixing structure comprises an engaging component, a first base and a second base engaged with the first base, the first base is connected to the lower leg rest and the second base is connected to the body, and a containing chamber is formed by engaging the first base with the second base along a horizontal direction, the engaging component is contained in the containing chamber.

24. The infant carrier of claim 23, wherein the second base comprises a stepping locking portion disposed in the containing chamber, the engaging component is slidably installed between the first base and the second base, and the engaging component is selectively engaged with the stepping locking portion.

25. The infant carrier of claim 24, wherein a line extending from a sliding direction of the engaging component intersects with a line extending from a pivotal axis of the first base and the second base.

26. The infant carrier of claim 25, wherein the second base comprises at least two locking portions disposed in the containing chamber, and the at least two locking portions are spaced along a pivoting direction of the lower leg rest to form the stepping locking portion.

27. The infant carrier of claim 21, wherein the lower leg rest adjusting device comprises a horizontal frame and two side frames connected to the horizontal frame, and the operating component is disposed on the horizontal frame.

28. The infant carrier of claim 27, wherein an opening is formed on the horizontal frame, and the operating component passes though the opening to be slidably disposed on the horizontal frame.

29. The infant carrier of claim 21, wherein when the operating component slides inward with respect to the lower leg rest to drive the pair of driving components to move close to each other, the operating component slides inward in a direction perpendicular to the longitudinal direction of the lower leg rest.

* * * * *